(12) United States Patent
Choe et al.

(10) Patent No.: US 10,947,327 B2
(45) Date of Patent: Mar. 16, 2021

(54) CATALYST COMPOSITION INCLUDING NOVEL TRANSITION METAL COMPOUND

(71) Applicant: LG Chem, Ltd., Seoul (KR)

(72) Inventors: Ik Je Choe, Daejeon (KR); Seul Ki Kim, Daejeon (KR); Ki Won Han, Daejeon (KR); Eun Jung Lee, Daejeon (KR); Choong Hoon Lee, Daejeon (KR)

(73) Assignee: LG Chem, Ltd.

( * ) Notice: Subject to any disclaimer, the term of this patent is extended or adjusted under 35 U.S.C. 154(b) by 157 days.

(21) Appl. No.: 15/742,674

(22) PCT Filed: Dec. 23, 2016

(86) PCT No.: PCT/KR2016/015232
§ 371 (c)(1),
(2) Date: Jan. 8, 2018

(87) PCT Pub. No.: WO2017/111553
PCT Pub. Date: Jun. 29, 2017

(65) Prior Publication Data
US 2018/0201697 A1 Jul. 19, 2018

(30) Foreign Application Priority Data

Dec. 24, 2015 (KR) .................. 10-2015-0186396

(51) Int. Cl.
*C08F 4/64* (2006.01)
*C08F 10/00* (2006.01)
(Continued)

(52) U.S. Cl.
CPC ............... *C08F 4/64* (2013.01); *C07F 17/00* (2013.01); *C08F 4/52* (2013.01); *C08F 10/00* (2013.01);
(Continued)

(58) Field of Classification Search
None
See application file for complete search history.

(56) References Cited

U.S. PATENT DOCUMENTS

| 5,064,802 A | 11/1991 | Stevens et al. |
| 7,741,240 B2 | 6/2010 | Solan et al. |

(Continued)

FOREIGN PATENT DOCUMENTS

| CN | 101213218 A | 7/2008 |
| CN | 104968692 A | 10/2015 |

(Continued)

OTHER PUBLICATIONS

Han et al. (KR 10-2016-0131707, a machine translation) (Year: 2016).*

(Continued)

*Primary Examiner* — Yun Qian
(74) *Attorney, Agent, or Firm* — Lerner, David, Littenberg, Krumholz & Mentlik, LLP

(57) ABSTRACT

The present invention relates to a catalyst composition including a transition metal compound represented by the following Formula 1; and one or more of a compound represented by the following Formula 2, a compound represented by the following Formula 3 and a compound represented by the following Formula 4. The catalyst composition according to the present invention has excellent copolymerization properties, and can be usefully used as a catalyst for a polymerization reaction for preparing an olefin-based polymer having a high molecular weight.

12 Claims, 4 Drawing Sheets

(51) Int. Cl.
*C08F 4/52* (2006.01)
*C07F 17/00* (2006.01)

(52) U.S. Cl.
CPC ...... *C08F 2410/03* (2013.01); *C08F 2500/01* (2013.01)

(56) References Cited

U.S. PATENT DOCUMENTS

| 2007/0225158 | A1 | 9/2007 | Lee et al. |
| 2014/0221587 | A1 | 8/2014 | Hagadorn et al. |
| 2018/0201697 | A1 | 7/2018 | Choe et al. |

FOREIGN PATENT DOCUMENTS

| CN | 105061493 | A | 11/2015 |
| KR | 20160131707 | A | 11/2016 |
| KR | 20160131708 | A | 11/2016 |
| WO | 0246249 | A2 | 6/2002 |
| WO | 03-040195 | A1 | 5/2003 |
| WO | 2004-099268 | A1 | 11/2004 |
| WO | 2009-082556 | A1 | 7/2009 |
| WO | 2010022228 | A2 | 2/2010 |
| WO | 2014-176187 | A1 | 10/2014 |

OTHER PUBLICATIONS

International Search Report From PCT/KR2016/015232 dated Mar. 31, 2017.

"ENGAGE™ Polyolefin Elastomers", Product Selection Guide, DOW Chemical Company, Aug. 2015, Retrieved from <http://msdssearch.dow.com/PublishedLiteratureDOWCOM/dh0940/0901b80380940420.pdf?filepath=elastomers/pdfs/noreg/774-00101.pdf&fromPage=GetDoc> on Mar. 30, 2017.

Gao, et al., "Pyridylamido Bi-Hafnium Olefin Polymerization Catalysis: Conformationally Supported Hf—Hf Enchainment Cooperativity", ACS Catalysis, vol. 5, No. 9, Jul. 27, 2015, pp. 5272-5282.

Luconi, et al., "Intramolecular Hydroamination Reactions Catalyzed by Neutral and Cationic Group IV Pyridylamido Complexes", ChemCatChem, vol. 5, No. 5, Sep. 28, 2012, pp. 1142-1151.

Supplementary European Search Report and Written Opinion for EP Application No. 16879420.4, dated Sep. 6, 2018.

Chinese Search Report for Application No. 201680044885.2 dated Aug. 4, 2020, 1 page.

Chinese Search Report from OA for Application No. 201680044885.2 dated Nov. 4, 2019.

\* cited by examiner

CATALYST COMPOSITION INCLUDING NOVEL TRANSITION METAL COMPOUND

CROSS-REFERENCE TO RELATED APPLICATION

This application is a national phase entry under 35 U.S.C. § 371 of International Application No. PCT/KR2016/015232, filed Dec. 23, 2016, which claims priority to Korean Patent Application No. 10-2015-0186396 filed, Dec. 24, 2015, the disclosures of which are incorporated herein by reference.

TECHNICAL FIELD

The present invention relates to a method of preparing a catalyst composition including a novel transition metal compound.

BACKGROUND ART

Metallocene catalysts for olefin polymerization have been developed for a long time. Metallocene compounds are generally activated by aluminoxane, borane, borate or other activators and used. For example, aluminoxane is used as an activator for a metallocene compound having a ligand including a cyclopentadienyl group and two sigma chloride ligands. A case in which, when a chloride group of the metallocene compound is replaced with another ligand (e.g., a benzyl or trimethylsilyl methyl group (—$CH_2SiMe_3$)), the effect of increasing catalytic activity or the like is exhibited, has been reported.

[$Me_2Si(Me_4C_5)NtBu$]$TiCl_2$ (constrained-geometry catalyst, CGC) was disclosed by U.S. Pat. No. 5,064,802 of the Dow Co. in the early 1990s, and excellent aspects of the CGC in the copolymerization reaction of ethylene and an alpha-olefin may be summarized in the following two points when compared to known metallocene catalysts: (1) Even at a high polymerization temperature, high activity is shown and a polymer having a high molecular weight is produced, and (2) the copolymerization degree of an alpha-olefin having large steric hindrance such as 1-hexene and 1-octene is excellent.

Further, as various properties of the CGC during a polymerization reaction are gradually known, efforts of synthesizing the derivatives thereof and using them as a polymerization catalyst have been actively conducted in academia and industry.

As one approach, the synthesis of a metal compound introducing various bridges instead of a silicon bridge and a nitrogen substituent and the polymerization thereof has been conducted. In representative metal compounds known until now, phosphorous, ethylene or propylene, methylidene or methylene bridges are introduced instead of the silicon bridge of a CGC structure, but excellent results in terms of polymerization activity, copolymerization performance or the like could not be obtained by applying to ethylene polymerization or copolymerization with an alpha-olefin when compared to those obtained by applying the CGC.

As another approach, many compounds including an oxido ligand instead of the amido ligand of the CGC have been synthesized, and attempts at polymerization using them have been conducted to some extent.

Further, a variety of asymmetric non-crosslinked metallocenes have been developed. For example, (cyclopentadienyl)(indenyl) and (cyclopentadienyl)(fluorenyl) metallocene, (substituted indenyl)(cyclopentadienyl) metallocene and the like are known.

However, in view of commercial use, the catalyst compositions of the non-crosslinked metallocenes do not sufficiently exhibit the polymerization activity of olefins, and polymerization of polyolefins having a high molecular weight is difficult.

DISCLOSURE

Technical Problem

An object of the present invention is to provide a catalyst composition including a novel transition metal compound.

Another object of the present invention is to provide a copolymer prepared using the catalyst composition.

Technical Solution

In order to solve the above-described problem, the present invention provides a catalyst composition including a transition metal compound represented by the following Formula 1; and one or more of a compound represented by the following Formula 2, a compound represented by the following Formula 3 and a compound represented by the following Formula 4.

[Formula 1]

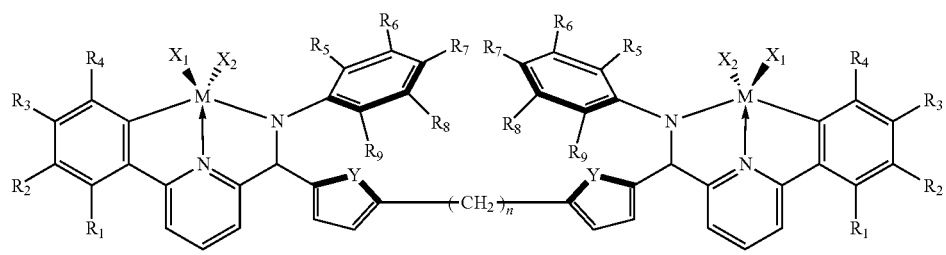

—[Al($R_{10}$)—O]$_a$—  [Formula 2]

A($R_{11}$)$_3$  [Formula 3]

[L-H]$^+$[WD$_4$]$^-$ or [L]$^+$[WD$_4$]$^-$  [Formula 4]

in Formula 1, $R_1$ to $R_9$ are each independently selected from the group consisting of hydrogen, a halogen, an alkyl having 1 to 20 carbon atoms, an alkenyl having 2 to 20 carbon atoms, a cycloalkyl having 3 to 20 carbon atoms, an aryl having 6 to 20 carbon atoms, an arylalkyl having 7 to 20 carbon atoms, an alkylaryl having 7 to 20 carbon atoms, an alkoxy having 1 to 20 carbon atoms, an aryloxy having 6 to 20 carbon atoms, a silyl, and a combination thereof, or two or more adjacent functional groups of $R_1$ to $R_9$ are connected to each other to form an aliphatic ring having 3 to 20 carbon atoms or an aromatic ring having 6 to 20 carbon atoms;

$X_1$ and $X_2$ are each independently selected from the group consisting of a halogen, an alkyl having 1 to 20 carbon atoms, an alkenyl having 2 to 20 carbon atoms, a cycloalkyl having 3 to 20 carbon atoms, an aryl having 6 to 20 carbon atoms, an alkylaryl having 7 to 20 carbon atoms, an arylalkyl having 7 to 20 carbon atoms, an alkylamino having 1 to 20 carbon atoms, an arylamino having 6 to 20 carbon atoms, and an alkylidene having 1 to 20 carbon atoms;

where the cycloalkyl and aryl may each be independently substituted with 1 to 5 substituents selected from the group consisting of a halogen, —$CF_3$, —$NO_2$, —OH, —SH, —CN, an alkoxy having 1 to 6 carbon atoms, an alkyl having 1 to 8 carbon atoms, an alkenyl having 2 to 8 carbon atoms, and an alkynyl having 2 to 8 carbon atoms;

M is a Group 4 metal; Y is a Group 16 element; n is an integer of 0 to 20;

in Formulas 2 to 4, $R_{10}$ and $R_{11}$ may be the same or different and are each independently selected from the group consisting of a halogen, a hydrocarbyl having 1 to 20 carbon atoms, and a hydrocarbyl having 1 to 20 carbon atoms substituted with a halogen;

FIG. 3 is an NMR spectrum of a compound prepared in Comparative Preparation Example 1.

FIG. 4 is an NMR spectrum of a compound prepared in Comparative Preparation Example 2.

BEST MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The catalyst composition of the present invention includes: a transition metal compound represented by the following Formula 1; and one or more of a compound represented by the following Formula 2, a compound represented by the following Formula 3 and a compound represented by the following Formula 4:

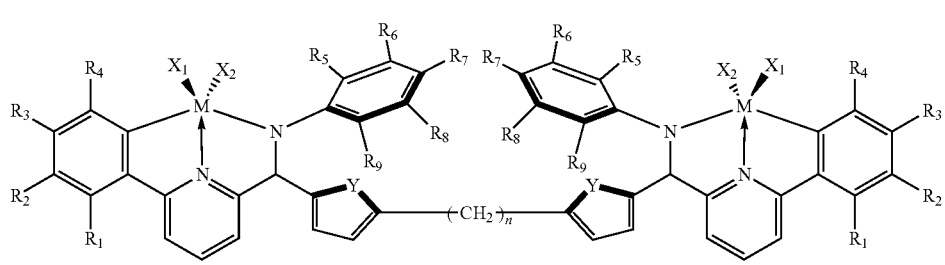

[Formula 1]

A is aluminum or boron;

D independently represents an aryl having 6 to 20 carbon atoms or an alkyl having 1 to 20 carbon atoms in which at least one hydrogen atom may be substituted with a substituent, and the substituent is at least one selected from the group consisting of a halogen, a hydrocarbyl having 1 to 20 carbon atoms, an alkoxy having 1 to 20 carbon atoms and an aryloxy having 6 to 20 carbon atoms;

H is a hydrogen atom; L is a neutral or cationic Lewis acid; W is a Group 13 element; and a is an integer of 2 or more.

Advantageous Effects

The catalyst composition including a novel transition metal compound according to the present has excellent copolymerization properties, and can be usefully used as a catalyst for a polymerization reaction for preparing an olefin-based polymer having a high molecular weight.

—[Al($R_{10}$)—O]$_a$—      [Formula 2]

A($R_{11}$)$_3$      [Formula 3]

[L-H]$^+$[WD$_4$]$^-$ or [L]$^+$[WD$_4$]$^-$      [Formula 4]

Figure 1:
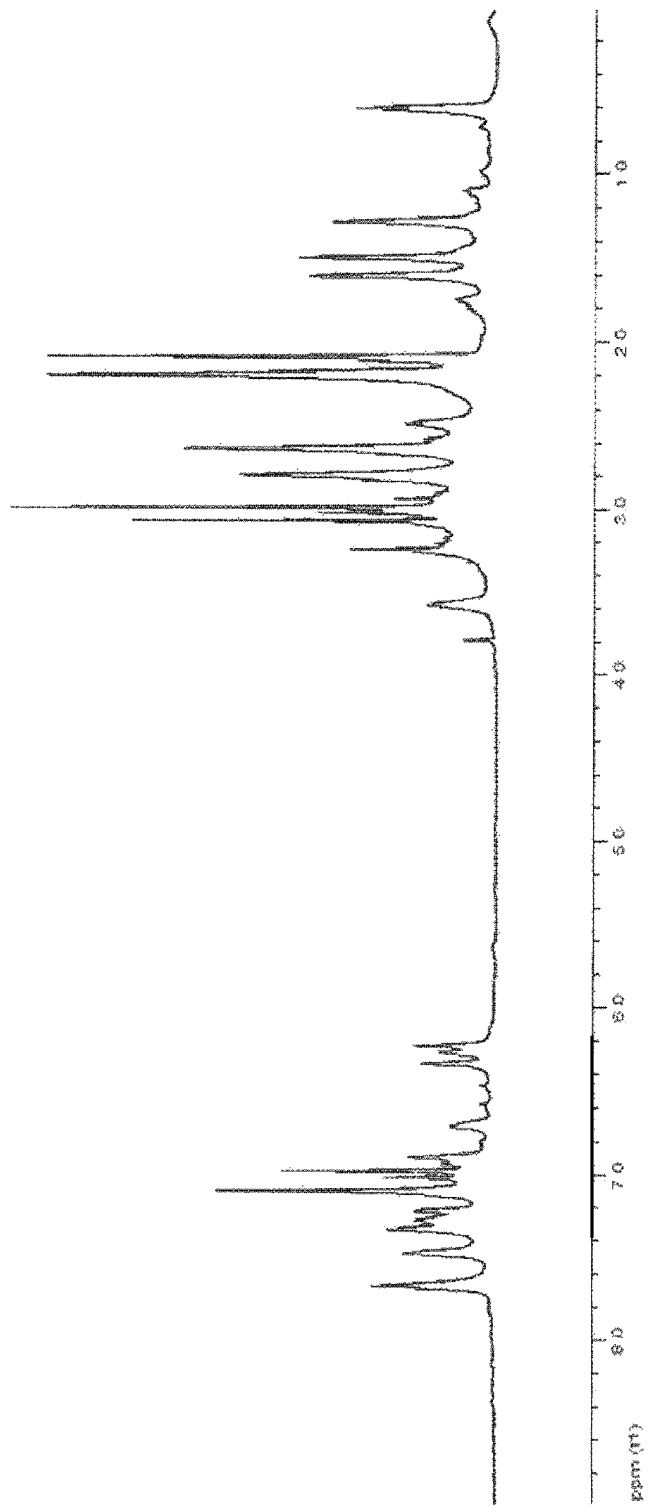
FIG. 1 is an NMR spectrum of a compound prepared in Preparation Example 2.

in Formula 1, $R_1$ to $R_9$ are each independently selected from the group consisting of hydrogen, a halogen, an alkyl having 1 to 20 carbon atoms, an alkenyl having 2 to 20 carbon atoms, a cycloalkyl having 3 to 20 carbon atoms, an aryl having 6 to 20 carbon atoms, an arylalkyl having 7 to 20 carbon atoms, an alkylaryl having 7 to 20 carbon atoms, an alkoxy having 1 to 20 carbon atoms, an aryloxy having 6 to 20 carbon atoms, a silyl, and a combination thereof, or two or more adjacent functional groups of $R_1$ to $R_9$ are connected to each other to form an aliphatic ring having 3 to 20 carbon atoms or an aromatic ring having 6 to 20 carbon atoms;

$X_1$ and $X_2$ are each independently selected from the group consisting of a halogen, an alkyl having 1 to 20 carbon atoms, an alkenyl having 2 to 20 carbon atoms, a cycloalkyl having 3 to 20 carbon atoms, an aryl having 6 to 20 carbon atoms, an alkylaryl having 7 to 20 carbon atoms, an arylalkyl having 7 to 20 carbon atoms, an alkylamino having 1 to 20 carbon atoms, an arylamino having 6 to 20 carbon atoms, and an alkylidene having 1 to 20 carbon atoms;

where the cycloalkyl and aryl may each be independently substituted with 1 to 5 substituents selected from the group consisting of a halogen, —$CF_3$, —$NO_2$, —OH, —SH, —CN, an alkoxy having 1 to 6 carbon atoms, an alkyl having 1 to 8 carbon atoms, an alkenyl having 2 to 8 carbon atoms, and an alkynyl having 2 to 8 carbon atoms;

M is a Group 4 metal; Y is a Group 16 element; n is an integer of 0 to 20;

in Formulas 2 to 4, $R_{10}$ and $R_{11}$ may be the same or different and are each independently selected from the group consisting of a halogen, a hydrocarbyl having 1 to 20 carbon atoms, and a hydrocarbyl having 1 to 20 carbon atoms substituted with a halogen;

A is aluminum or boron;

D independently represents an aryl having 6 to 20 carbon atoms or an alkyl having 1 to 20 carbon atoms in which at least one hydrogen atom may be substituted with a substituent, and the substituent is at least one selected from the group consisting of a halogen, a hydrocarbyl having 1 to 20 carbon atoms, an alkoxy having 1 to 20 carbon atoms and an aryloxy having 6 to 20 carbon atoms;

H is a hydrogen atom; L is a neutral or cationic Lewis acid; W is a Group 13 element; and a is an integer of 2 or more.

Further, in an example of the present invention, in Formula 1, R1 to $R_9$ may each be independently selected from the group consisting of hydrogen, a halogen, and an alkyl having 1 to 8 carbon atoms, and $R_1$ and $R_2$ may be bonded to each other to form an aliphatic ring having 3 to 12 carbon atoms or an aromatic ring having 6 to 12 carbon atoms;

$X_1$ and $X_2$ may each be independently selected from the group consisting of a halogen, an alkyl having 1 to 12 carbon atoms, an alkylamino having 1 to 12 carbon atoms, and an arylamino having 6 to 12 carbon atoms;

where the cycloalkyl and aryl may each be independently substituted with 1 to 5 substituents selected from the group consisting of a halogen, an alkoxy having 1 to 6 carbon atoms, and an alkyl having 1 to 6 carbon atoms;

M may be Ti, Zr or Hf;

Y may be O or S; and n may be an integer of 0 to 8.

Further, in an example of the present invention, in Formula 1, $R_1$ to $R_9$ may each be independently selected from the group consisting of hydrogen and an alkyl having 1 to 6 carbon atoms, and $R_1$ and $R_2$ may be bonded to each other to form an aromatic ring having 5 to 12 carbon atoms;

$X_1$ and $X_2$ may each be independently selected from the group consisting of an alkylamino having 1 to 6 carbon atoms and an arylamino having 6 to 12 carbon atoms;

where the cycloalkyl and aryl may each be independently substituted with 1 to 5 substituents selected from the group consisting of a halogen, an alkoxy having 1 to 6 carbon atoms, and an alkyl having 1 to 6 carbon atoms;

Y may be O or S; and n may be an integer of 0 to 8.

The transition metal compound represented by Formula 1 may be a compound of the following Formula 5:

[Formula 5]

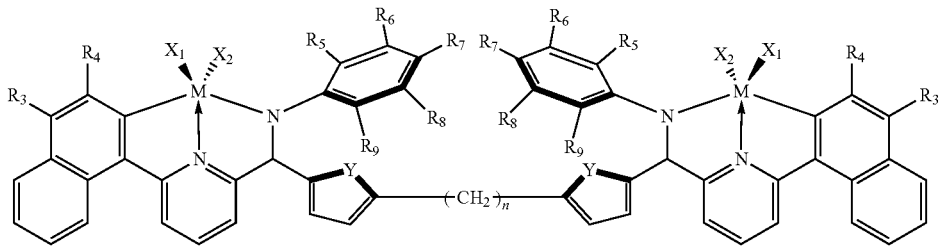

in Formula 5, $R_3$ to $R_9$ are each independently selected from the group consisting of hydrogen and an alkyl having 1 to 6 carbon atoms;

$X_1$ and $X_2$ each independently represent an alkylamino having 1 to 6 carbon atoms;

Y is O or S; and n is an integer of 0 to 8.

In an example of the present invention, the compound of Formula 1 may be selected from the group consisting of the following Formulas 6a to 6r.

(6a)

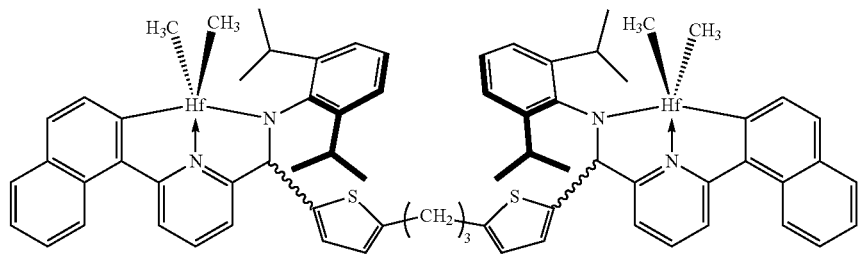

-continued
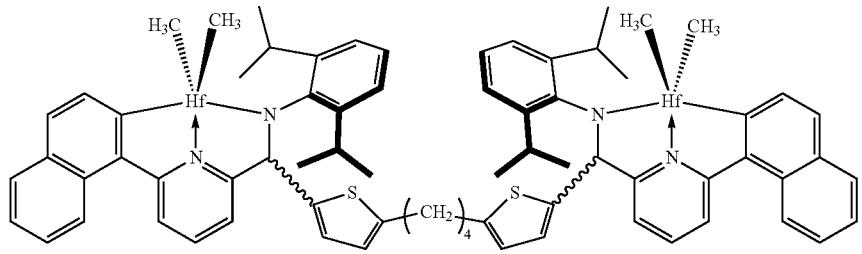
(6b)
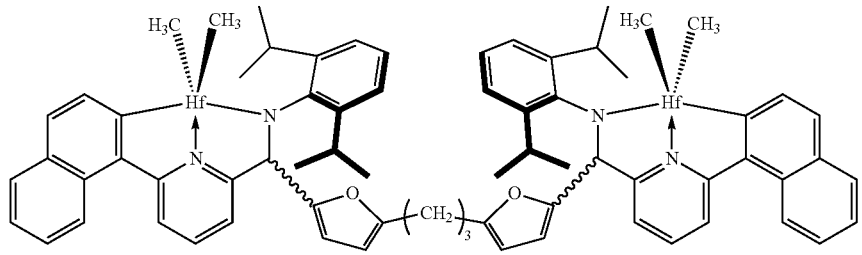
(6c)
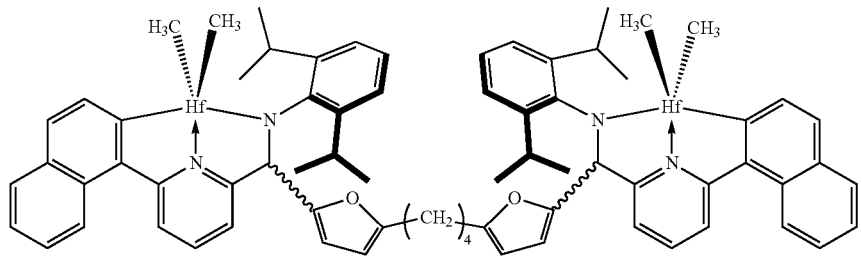
(6d)
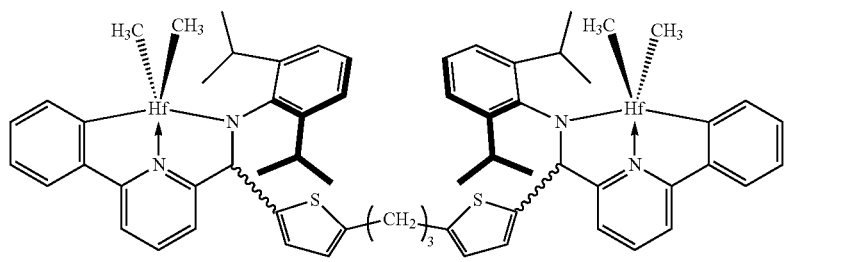
(6e)
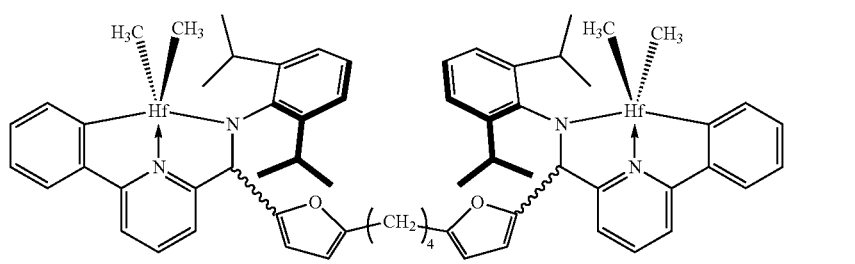
(6f)
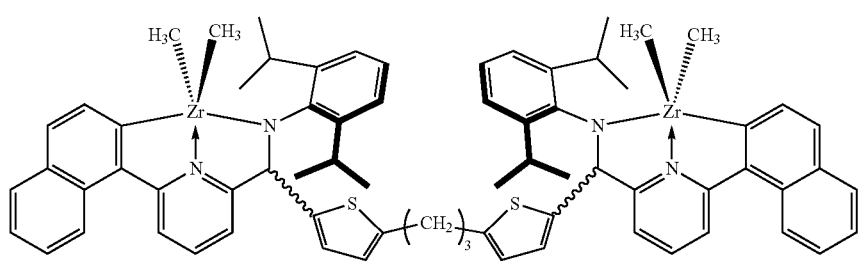
(6g)

-continued
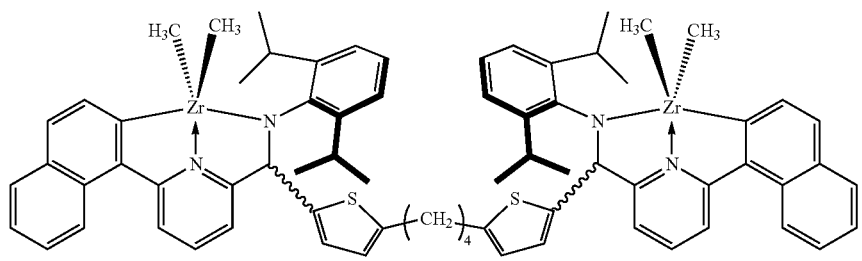
(6h)
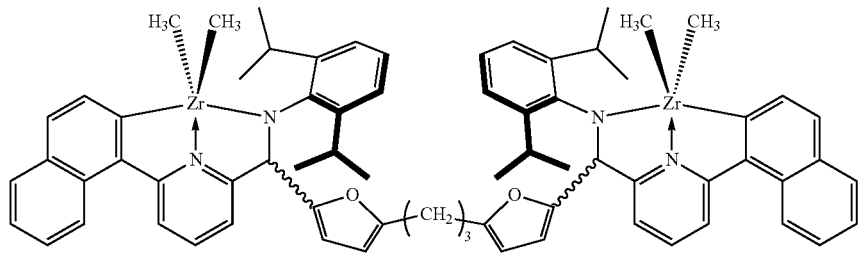
(6i)
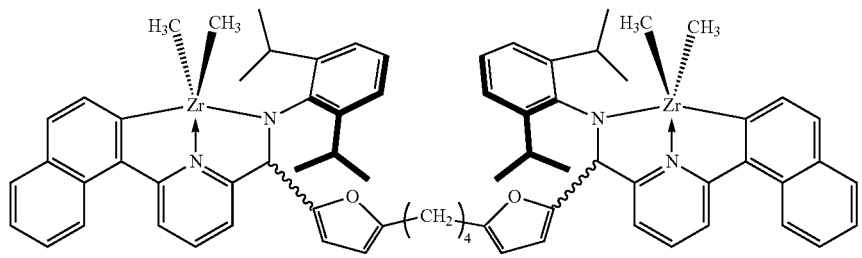
(6j)
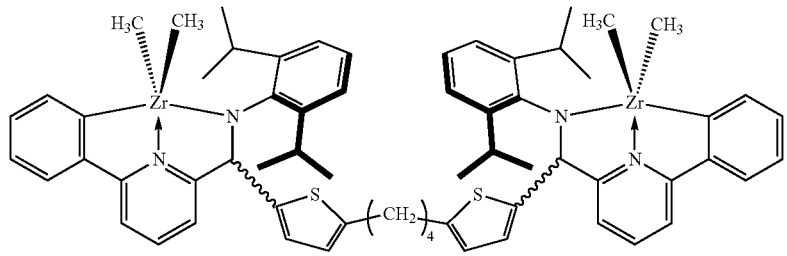
(6k)
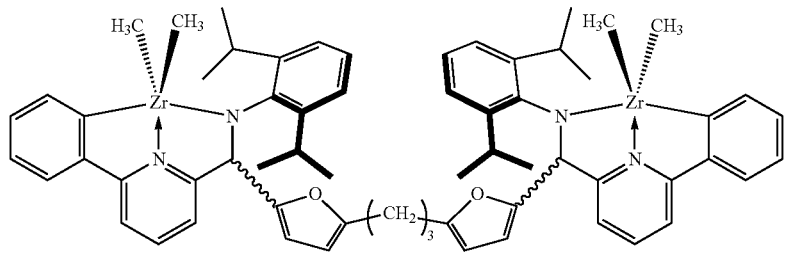
(6l)
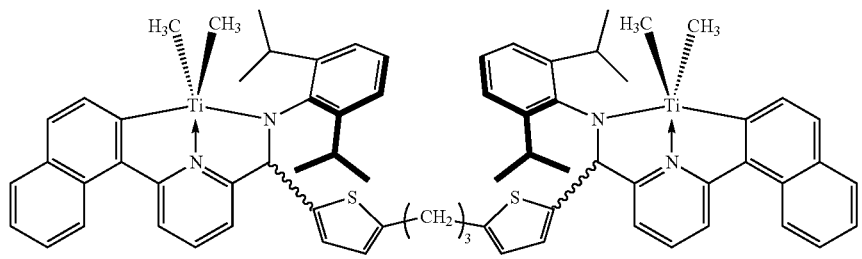
(6m)

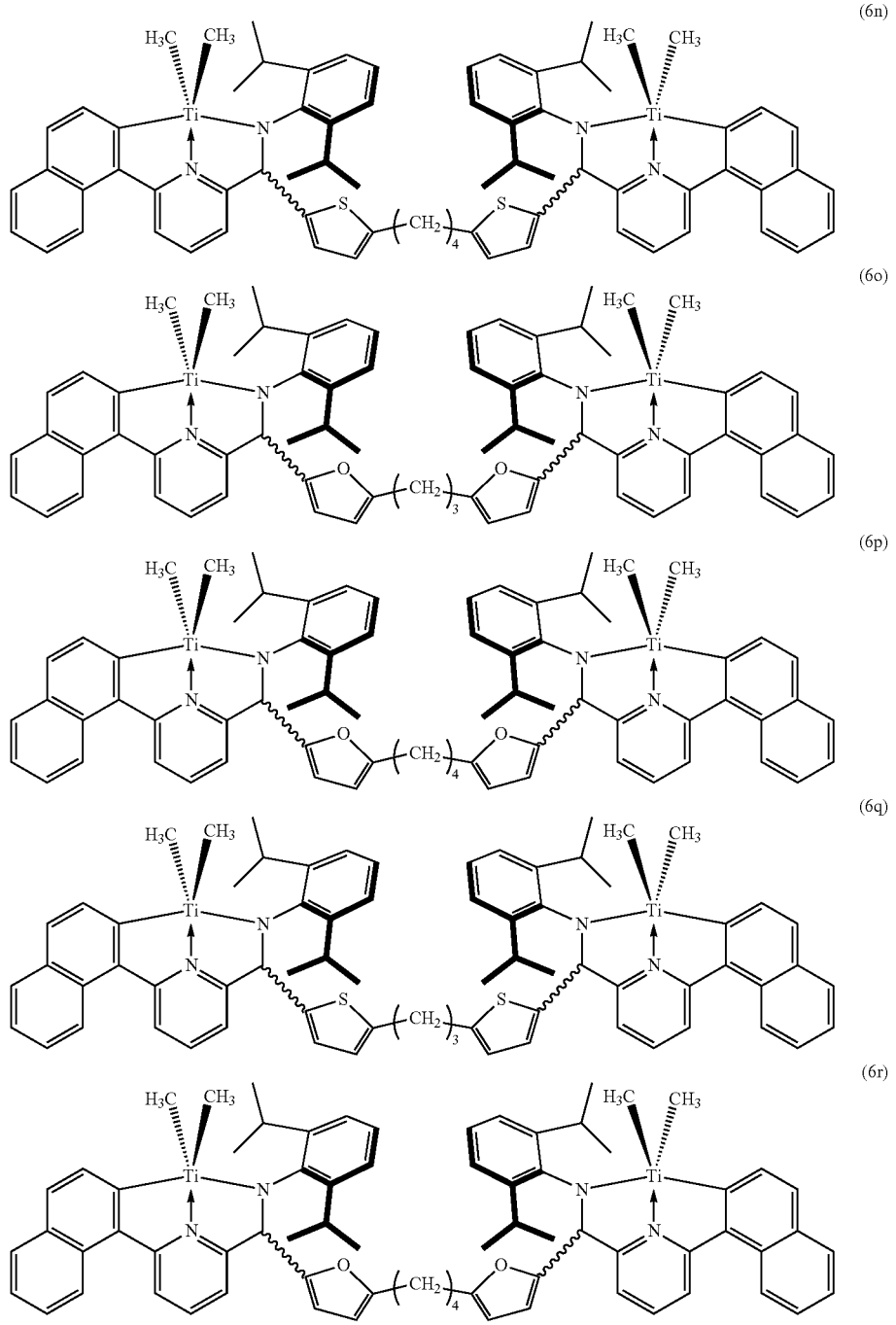

Since the catalyst composition according to the present invention includes the transition metal compound represented by Formula 1 and one or more of compounds represented by Formulas 2 to 4, a polyolefin having high crystallinity, high density, and high molecular weight can be prepared even at a high polymerization temperature when the catalyst composition is applied to the polymerization of an olefin. Particularly, a polymer having a narrow MWD, excellent copolymerization properties, and a high molecular weight in a low density region can be prepared by using the catalyst composition as compared to CGC.

The compound represented by Formula 2 may be one or more selected from the group consisting of methyl aluminoxane (MAO), ethyl aluminoxane, isobutyl aluminoxane, and butyl aluminoxane, and a modified alkyl aluminoxane in which two or more of the alkyl aluminoxanes are mixed, and specifically may be a modified methyl aluminoxane or methyl aluminoxane.

The compound represented by Formula 3 may be one or more selected from the group consisting of trimethyl aluminum, triethyl aluminum, triisobutyl aluminum, tripropyl aluminum, tributyl aluminum, dimethylchloroaluminum, triisopropyl aluminum, tri-s-butyl aluminum, tricyclopentyl aluminum, tripentyl aluminum, triisopentyl aluminum, trihexyl aluminum, trioctyl aluminum, ethyl dimethyl aluminum, methyl diethyl aluminum, triphenyl aluminum, tri-p-tolyl aluminum, dimethyl aluminum methoxide, dimethyl aluminum ethoxide, trimethylboron, triethylboron, triisobutylboron, tripropylboron, tributylboron and the like, and specifically, may be one or more selected from the group consisting of trimethyl aluminum, triethyl aluminum and triisobutyl aluminum.

The compound represented by Formula 4 may be one or more selected from the group consisting of triethylammonium tetraphenylboron, tributylammonium tetraphenylboron, trimethylammonium tetraphenylboron, tripropylammonium tetraphenylboron, trimethylammonium tetra(p-tolyl) boron, trimethylammonium tetra (o,p-dimethylphenyl) boron, tributylammonium tetra(p-trifluoromethylphenyl) boron, trimethylammonium tetra(p-trifluoromethylphenyl) boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, dimethylanilinium tetrakis(pentafluorophenyl) borate, triethylammonium tetraphenyl aluminum, tributylammonium tetraphenyl aluminum, trimethylammonium tetraphenyl aluminum, tripropylammonium tetraphenyl aluminum, trimethylammonium tetra(p-tolyl) aluminum, tripropylammonium tetra(p-tolyl) aluminum, triethylammonium tetra(o,p-dimethylphenyl) aluminum, tributylammonium tetra(p-trifluoromethylphenyl) aluminum, trimethylammonium tetra(p-trifluoromethylphenyl) aluminum, tributylammonium tetrapentafluorophenyl aluminum, N,N-diethylanilinium tetraphenyl aluminum, N,N-diethylanilinium tetrapentafluorophenyl aluminum, diethylammonium tetrapentatetraphenyl aluminum, triphenylphosphonium tetraphenyl aluminum, trimethylphosphonium tetraphenyl aluminum, tripropylammonium tetra(p-tolyl) boron, triethylammoniumtetra(o,p-dimethylphenyl) boron, triphenylcarbonium tetra(p-trifluoromethylphenyl) boron, triphenylcarbonium tetrapentafluorophenylboron, etc.

The definition of each substituent used in the present specification is described in detail as follows.

The term "halogen" used in the present specification, unless otherwise specified, refers to fluorine, chlorine, bromine and iodine.

The term "alkyl" used in the present specification, unless otherwise specified, refers to a linear or branched hydrocarbon residue.

The term "alkenyl" used in the present specification, unless otherwise specified, refers to a linear or branched alkenyl group.

The branched chain may be an alkyl having 1 to 20 carbon atoms; an alkenyl having 2 to 20 carbon atoms; an aryl having 6 to 20 carbon atoms; an alkylaryl having 7 to 20 carbon atoms; or an arylalkyl having 7 to 20 carbon atoms.

According to an example of the present invention, the silyl group includes trimethyl silyl, triethyl silyl, tripropyl silyl, tributyl silyl, trihexyl silyl, triisopropyl silyl, triisobutyl silyl, triethoxy silyl, triphenyl silyl, tris(trimethylsilyl) silyl, but is not limited thereto.

According to an example of the present invention, the aryl group preferably has 6 to 20 carbon atoms, and specifically includes phenyl, naphthyl, anthracenyl, pyridyl, dimethylanilinyl, anisolyl and the like, but is not limited thereto.

The alkylaryl group refers to an aryl group substituted with the alkyl group.

The arylalkyl group refers to an alkyl group substituted with the aryl group.

The ring (or a heterocyclic group) refers to a monovalent aliphatic or aromatic hydrocarbon group which has a ring atom with 5 to 20 carbon atoms and contains one or more heteroatoms, and may be a single ring or a condensed ring of two or more rings. Further, the heterocyclic group may be unsubstituted or substituted with an alkyl group. Examples thereof include indoline, tetrahydroquinoline and the like, but the present invention is not limited thereto.

The alkylamino group refers to an amino group substituted with the alkyl group, and includes a dimethylamino group, a diethylamino group and the like, but is not limited thereto.

According to an embodiment of the present invention, the aryl group preferably has 6 to 20 carbon atoms, and specifically includes phenyl, naphthyl, anthracenyl, pyridyl, dimethylanilinyl, anisolyl and the like, but is not limited thereto.

The transition metal compound of Formula 1 may be a combination of the ligand represented by the following Formula 7 and the transition metal represented by M.

[Formula 7]

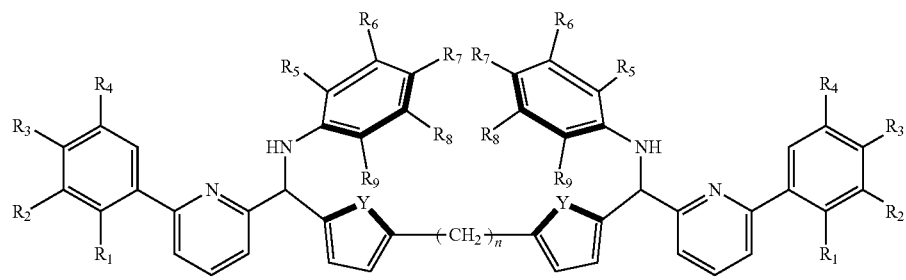

In Formula 7, $R_1$ to $R_9$, n, and Y are as defined in Formula 1, respectively.

The ligand compound represented by Formula 7 may be prepared by a method including the following steps: a) reacting a compound represented by the following Formula 8 with an organolithium compound, and further reacting with a compound represented by the following Formula 9 to prepare a compound represented by the following Formula 10; and b) reacting the compound represented by the following Formula 10 with an organolithium compound, and further reacting with a compound represented by the following Formula 11 to prepare a compound represented by Formula 7.

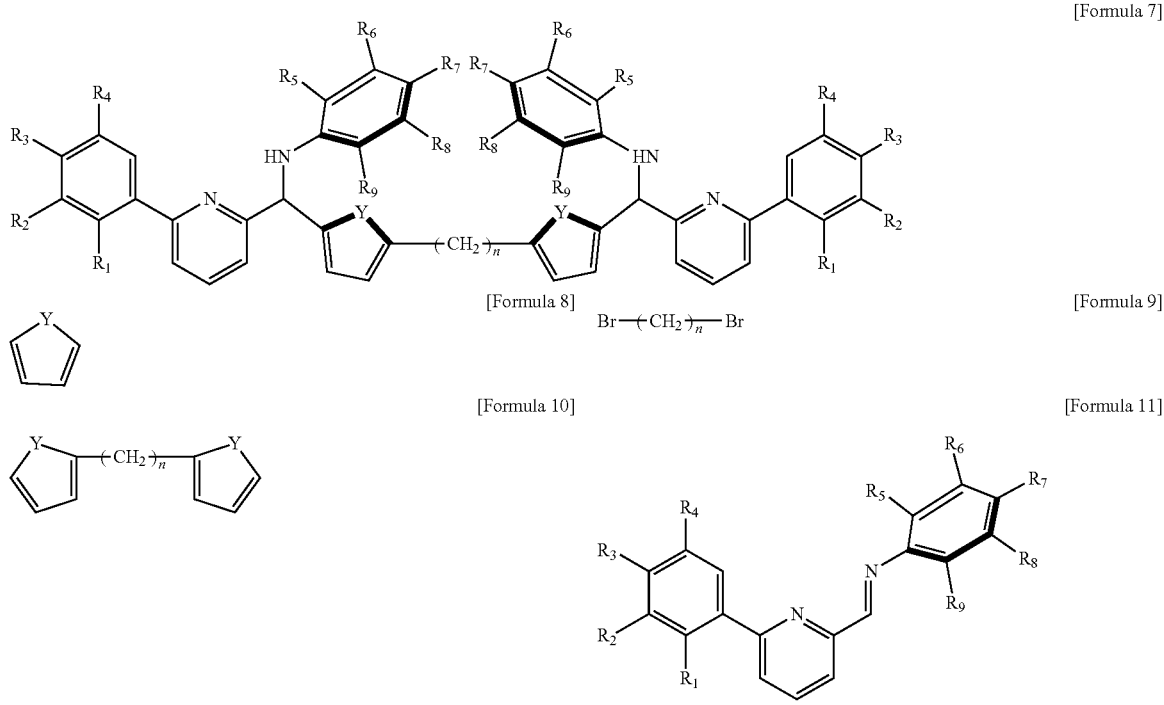

In the above Formulas, $R_1$ to $R_9$, Y, and n in the formula are as defined in Formula 1, respectively.

First, in Step a), a compound represented by Formula 8 is reacted with an organolithium compound, and then further reacted with a compound represented by the following Formula 9 to prepare a compound represented by the following Formula 10.

The reaction of the compound of Formula 8 with the organolithium compound may be carried out in a temperature range of −90 to 40° C. Specifically, a process of adding the organolithium compound to the compound of Formula 8 may be performed in a temperature range of −90 to 10° C., specifically from −78 to 10° C., and then a mixture may be stirred in a temperature range of 0 to 40° C. for 30 minutes to 6 hours.

A process of further reacting with the compound represented by Formula 9 to prepare the compound represented by Formula 10 may be performed in a temperature range of −25 to 40° C. Specifically, a process of adding the compound represented by Formula 9 to the stirred mixture may be performed in a temperature range of −25 to 15° C., and then the mixture may be stirred in a temperature range of 0 to 40° C. for 1 to 24 hours.

In Step b), the compound represented by Formula 10 is reacted with an organolithium compound, and then further reacted with a compound represented by Formula 11 to prepare a ligand compound represented by Formula 7.

A process of adding an organolithium compound to the compound represented by Formula 10 may be performed in a temperature range of −90 to 40° C., specifically from −78 to 10° C., and then the mixture may be stirred in a temperature range of 0 to 40° C. for 30 minutes to 6 hours.

A process of reacting the compound represented by Formula 11 with the stirred mixture to prepare the compound represented by Formula 7 may be performed in a temperature range of −25 to 40° C., and may be performed by gradually adding the compound represented by Formula 11 to the reaction product of the compound represented by Formula 10 and the organolithium compound, and then stirring the mixture for 1 to 24 hours.

Specifically, the organolithium compound may be alkyl lithium, cycloalkyl lithium, allyl lithium, vinyl lithium, aryl lithium, arylalkyl lithium or alkylaryl lithium. More specifically, examples of the organolithium-based compound include methyl lithium, ethyl lithium, isopropyl lithium, n-butyl lithium, sec-butyl lithium, t-butyl lithium, isobutyl lithium, pentyl lithium, isopentyl lithium, cyclopentyl lithium, cyclohexyl lithium, hexyl lithium, octyl lithium, allyl lithium, vinyl lithium, phenyl lithium, benzyl lithium and the like, and one or a mixture of two or more thereof may be used. The organolithium-based compound may be methyl lithium, n-butyl lithium, t-butyl lithium or a mixture thereof in consideration of excellent reactivity with the compound represented by Formula 4.

The reaction may be carried out in a solvent such as methanol or tetrahydrofuran.

Furthermore, the compound represented by Formula 11 may be prepared using a known method, and specifically, the preparation method is disclosed in U.S. Patent Application Publication No. 2004/0220050 A1.

The transition metal compound represented by Formula 1 may be prepared by a reaction between a ligand compound represented by Formula 7 and a compound represented by Formula 12.

$$M(X_1)_m(X_2)_{4-m}$$ [Formula 12]

In Formula 12, $X_1$ and $X_2$ are as defined in Formula 1, and m is an integer of 0 to 4.

Further, in the preparation of the transition metal compound, examples of a reaction solvent include aliphatic hydrocarbon-based solvents such as pentane, hexane, heptane and the like, or aromatic solvents such as benzene, toluene and the like, but are not limited thereto, and any solvent available in the art may be used.

As the first method, the catalyst composition of the present invention may be prepared using a method including the following steps: 1) contacting the transition metal compound represented by Formula 1 with the compound represented by Formula 2 or 3 to obtain a mixture; and 2) adding a compound represented by Formula 4 to the mixture.

Further, as the second method, the catalyst composition may be prepared using a method of contacting the transition metal compound represented by Formula 1 with the compound represented by Formula 2.

In the first method among the methods of preparing the catalyst composition, the molar ratio of the transition metal compound represented by Formula 1/the compound represented by Formula 2 or 3 may preferably be 1/5,000 to 1/2, specifically 1/1,000 to 1/10, and more specifically 1/500 to 1/20. When the molar ratio of the transition metal compound represented by Formula 1/the compound represented by Formula 2 or 3 exceeds 1/2, the amount of an alkylating agent is very small, and the alkylation of a metal compound may not be completely carried out, and when the molar ratio is less than 1/5,000, the activation of the alkylated metal compound may not be completely carried out due to the side reaction of the remaining excessive alkylating agent with the activation agent which is the compound of Formula 4 even though the alkylation of the metal compound may be carried out. Further, the molar ratio of the transition metal compound represented by Formula 1/the compound represented by Formula 4 may preferably be 1/25 to 1, specifically 1/10 to 1, and more specifically 1/5 to 1. When the molar ratio of the transition metal compound represented by Formula 1/the compound represented by Formula 4 exceeds 1, the amount of the activation agent is relatively small, and the activation of the metal compound may not be completely carried out, thereby deteriorating the activity of the catalyst composition prepared. When the molar ratio is less than 1/25, the remaining excessive amount of the activation agent may decrease the economic performance in terms of the unit price of the catalyst composition, or the purity of a polymer thus produced may be decreased even though the activation of the metal compound may be completely carried out.

In the second method among the methods of preparing the catalyst composition, the molar ratio of the transition metal compound represented by Formula 1/the compound represented by Formula 2 preferably be 1/10,000 to 1/10, specifically 1/5,000 to 1/100, and more specifically 1/3,000 to 1/500. When the molar ratio exceeds 1/10, the amount of the activation agent is relatively small, and the activation of the metal compound may not be completely carried out, thereby deteriorating the activity of the catalyst composition prepared. When the molar ratio is less than 1/10,000, the remaining excessive amount of the activation agent may decrease the economic performance in terms of the unit price of the catalyst composition, or the purity of a polymer thus produced may be decreased even though the activation of the metal compound may be completely carried out.

Hydrocarbon-based solvents such as pentane, hexane, heptane and the like, or aromatic solvents such as benzene, toluene and the like may be used as the reaction solvent in the preparation of the catalyst composition.

Further, the catalyst composition may include the transition metal compound and a cocatalyst compound in the form of being supported on a carrier. Here, an inorganic carrier such as silica or alumina may be used as the carrier. As such, when the catalyst composition is used in the form of being supported on an inorganic carrier, it may be useful for slurry polymerization or gas phase polymerization in polymerization for the preparation of an olefin-based polymer.

Specifically, the polymerization reaction for polymerizing an olefin-based monomer in the presence of a catalyst composition containing the transition metal compound may be carried out by a solution polymerization process, a slurry process or a gas phase process using a continuous-slurry polymerization reactor, a loop slurry reactor, a gas phase reactor or a solution reactor. Further, homopolymerization with one olefin monomer or copolymerization with two or more types of monomers may be performed.

The polymerization of the polyolefin may be carried out by reaction at a temperature of about 25 to about 500° C. and a pressure of about 1 to about 100 kgf/cm$^2$.

Specifically, the polymerization of the polyolefin may be carried out at a temperature of about 25 to about 500° C., specifically about 25 to 200° C., and more specifically about 50 to 100° C. Further, a reaction pressure may be about 1 to about 100 kgf/cm$^2$, specifically about 1 to about 50 kgf/cm$^2$, and more specifically about 5 to about 40 kgf/cm$^2$.

Further, examples of olefin-based monomers polymerizable using the transition metal compound and cocatalyst according to an embodiment of the present invention include ethylene, alpha-olefins, cyclic olefins and the like, and diene olefin-based monomers or triene olefin-based monomers having two or more double bonds may also be polymerized.

In the polyolefin prepared according to the present invention, specific examples of the olefin-based monomer include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene and the like, or a copolymer obtained by copolymerizing two or more thereof.

The polyolefin may be, but is not limited to, a propylene polymer.

The polymer may be either a homopolymer or a copolymer. When the olefin polymer is a copolymer of ethylene and another comonomer, the monomer forming the copolymer is preferably ethylene and at least one comonomer selected from the group consisting of propylene, 1-butene, 1-hexene, 4-methyl-1-pentene and 1-octene.

MODES OF THE INVENTION

Hereinafter, preferred examples are provided to allow for a clearer understanding of the present invention. However, the following examples are merely presented to exemplify the present invention, and the scope of the present invention is not limited thereto.

Synthesis of ligand and transition metal compound
Organic reagents and solvents were purchased from Aldrich and Merck, and purified by a standard method and used. In all synthetic steps, the contact of the air and moisture were blocked to improve the reproducibility of experiments.

Spectrums and images were obtained by using 500 MHz nuclear magnetic resonance (NMR) for the identification of the structure of the compound.

EXAMPLES

Preparation Example 1

Preparation of Ligand Compound

Preparation of 1,3-di(thiophen-2-yl) propane

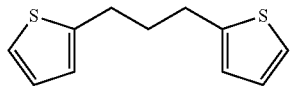 [SMILES: c1csc(CCCc2cccs2)c1]

Thiophene (12.4 g, 147.4 mmol) was dissolved in anhydrous tetrahydrofuran (148 mL) at room temperature and n-BuLi (59 mL, 147.4 mmol) was added at −78° C. After stirring at room temperature for 2 hours, 1,3-dibromopropane (9.95 g, 49.1 mmol) was slowly added at 0° C. After stirring overnight at room temperature, 100 mL of distilled water was added. An organic layer was extracted with diethyl ether and water, water was removed with MgSO$_4$, and a solid was filtered. The filtrate was concentrated to obtain a product in the form of orange oil (9.5 g, a yield of 92.8%).

$^1$H-NMR (500 MHz, CDCl$_3$): 7.13 (dd, J1=5.5 Hz, J2=1.5 Hz, 2H), 6.93 (dd, J1=5.0 Hz, J2=3.5 Hz, 2H), 6.81-6.80 (m, 2H), 2.90 (t, J=7.5 Hz, 4H), 2.07 (quintet, J=7.5 Hz, 2H)

Preparation of (E)-2,6-diisopropyl-N-((6-(naphthalen-1-yl)pyridin-2-yl)methylene)aniline

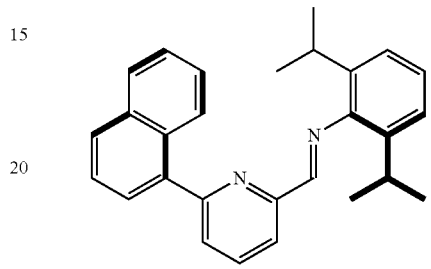

(E)-2,6-diisopropyl-N-((6-(naphthalen-1-yl)pyridin-2-yl)methylene)aniline was prepared using a method disclosed in U.S. Patent Application Publication 2004/0220050 A1.

Preparation of Ligand

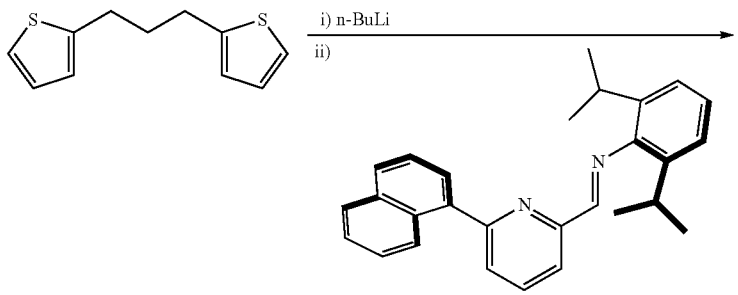

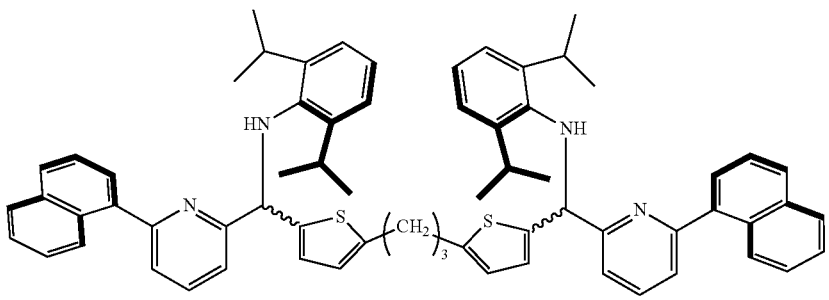

1,3-di(thiophen-2-yl) propane (2.0 g, 9.60 mmol) prepared as above was dissolved in anhydrous tetrahydrofuran (9.5 mL) at room temperature, and n-BuLi (7.7 mL, 19.2 mmol) was added thereto at −78° C. After stirring at room temperature for 3 hours, anhydrous (E)-2,6-diisopropyl-N-((6-(naphthalen-1-yl)pyridin-2-yl) methylene) aniline (0.2 M in diethyl ether, 14.4 mmol) was slowly injected. After stirring at room temperature overnight, 1 N NH$_4$Cl (20 mL) was added. An organic layer was extracted with diethyl ether and water, water was removed with Na$_2$SO$_4$, and a solid was filtered. N-hexane (200 mL) was added to a crude product obtained by concentrating a filtrate, and a mixture was stirred at 70° C. for 1 hour. The mixture from which a solution part was removed was left at −20° C. overnight. The resulting solid was washed with n-hexane and vacuum-dried to obtain a pale yellow solid (4.70 g, a yield of 66.0%).

$^1$H-NMR (500 MHz, CDCl$_3$): 8.19 (d, J=8.5 Hz, 2H), 7.90 (t, J=8.5 Hz, 4H), 7.76-7.72 (m, 2H), 7.66 (d, J=7.0 Hz, 2H), 7.56 (t, J=7.5 Hz, 2H), 7.52-7.50 (m, 2H), 7.47 (t, J=7.0 Hz, 2H), 7.39 (t, J=7.5 Hz, 2H), 7.25 (t, J=7.5 Hz, 2H), 7.03-6.99 (m, 6H), 6.58-6.54 (m, 4H), 5.47 (s, 2H), 4.91 (s, 2H), 3.26-3.21 (m, 4H), 2.77 (t, J=7.5 Hz, 4H), 1.95 (t, J=7.0 Hz, 2H), 1.06 (d, J=3.3 Hz, 12H), 1.01 (d, J=3.3 Hz, 12H)

Preparation Example 2

<Preparation of Transition Metal Compound>

The ligand (1 g, 1.01 mmol) prepared in Preparation Example 1 and Hf(NMe$_2$)$_4$ (0.75 g, 2.12 mmol) were dissolved in anhydrous toluene (20 mL) at room temperature and stirred at 90° C. for 1 hour. After a certain period of time, the mixture was vacuum-dried to remove a solvent, and then dried n-hexane (20 mL) was added thereto, stirred for 10 minutes, and vacuum-dried again. This process was repeated once again, and then dried n-hexane (40 mL) was added thereto. The mixture was stirred vigorously for 10 minutes to disperse the solid, and was filtered with glass frit (G4) to obtain a yellow solid product (1.76 g, quantitative yield).

The NMR spectrum thereof is shown in FIG. 1.

Preparation Example 3

Preparation of Ligand Compound

Preparation of 1,3-di(thiophen-2-yl) butane

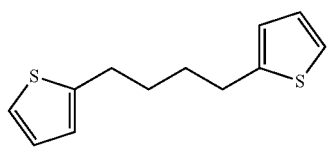

Thiophene (10.6 g, 125.7 mmol) was dissolved in anhydrous tetrahydrofuran (126 mL) at room temperature, and n-BuLi (50.3 mL, 125.7 mmol) was added at −78° C. After stirring at room temperature for 2 hours, 1,4-dibromobutane (9.04 g, 41.9 mmol) was slowly added at 0° C. After stirring at room temperature overnight, 100 mL of distilled water was added. An organic layer was extracted with diethyl ether and water, water was removed with MgSO$_4$, and a solid was filtered. The filtrate was concentrated to obtain a product in the form of orange oil (8.5 g, a yield of 92.1%).

$^1$H-NMR (500 MHz, CDCl$_3$): 7.11 (dd, J1=5.0 Hz, J2=1.0 Hz, 2H), 6.91 (dd, J1=5.0 Hz, J2=3.5 Hz, 2H), 6.78-6.77 (m, 2H), 2.88-2.85 (m, 4H), 1.78-1.73 (m, 4H)

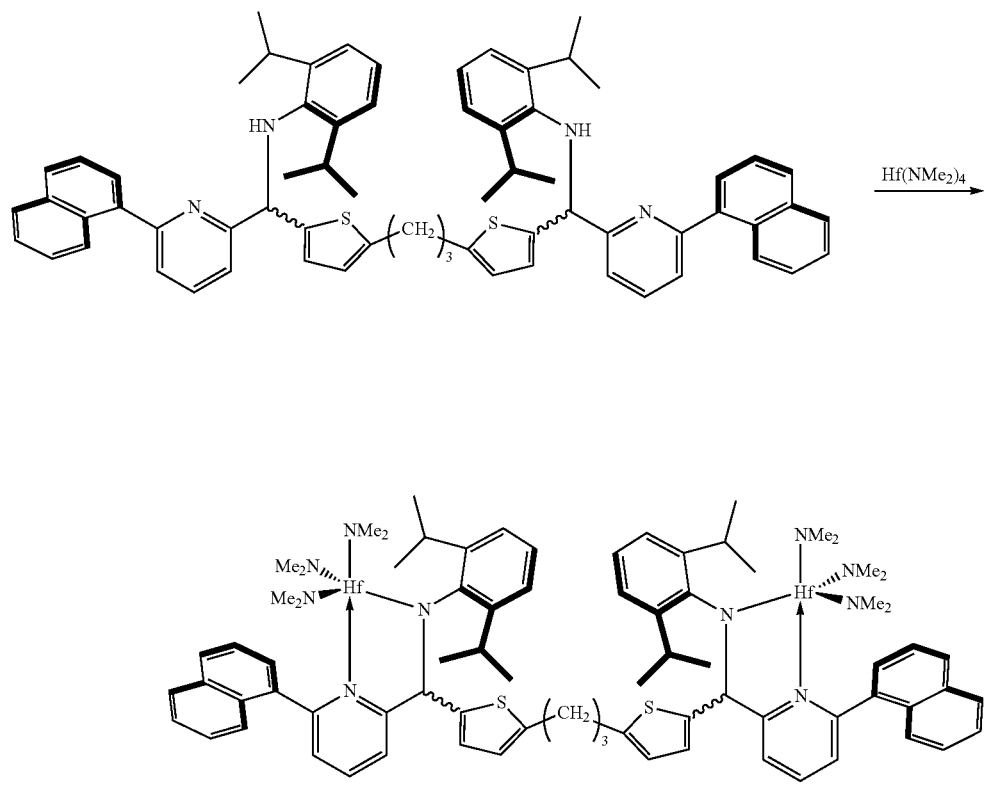

Preparation of Ligand

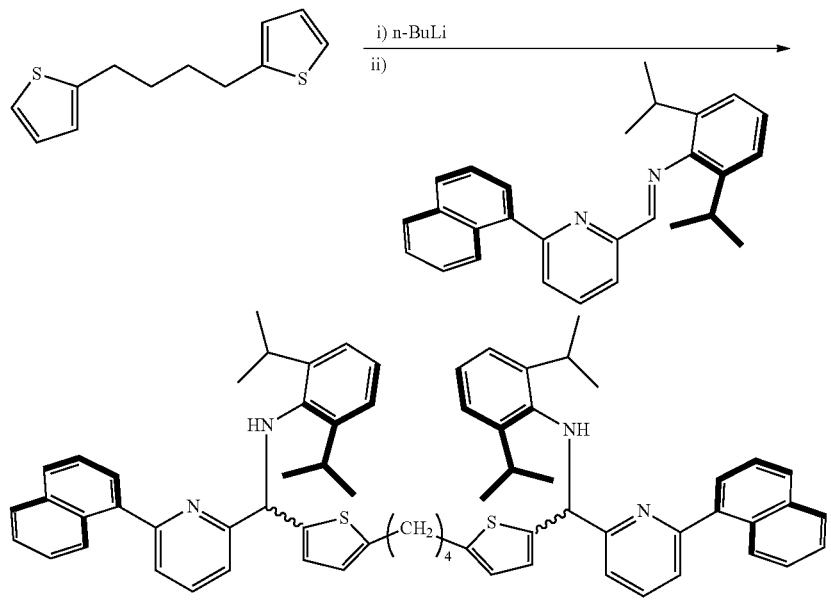

1,3-di(thiophen-2-yl) butane (1.0 g, 4.48 mmol) prepared as above was dissolved in anhydrous tetrahydrofuran (4.4 mL) at room temperature, and then n-BuLi (3.6 mL, 8.96 mmol) was added at −78° C. After stirring at room temperature for 3 hours, anhydrous (E)-2,6-diisopropyl-N-((6-(naphthalen-1-yl)pyridin-2-yl) methylene) aniline (0.2 M in diethyl ether, 6.72 mmol) prepared in Preparation Example 1 was slowly injected. After stirring at room temperature overnight, 1 N NH$_4$Cl (10 mL) was added. An organic layer was extracted with diethyl ether and water, water was removed with Na$_2$SO$_4$, and a solid was filtered. N-Hexane (100 mL) was added to a crude product obtained by concentrating a filtrate, and a mixture was stirred at 70° C. for 1 hour. The mixture from which a solution portion was removed was left at −20° C. overnight. The resulting solid was washed with n-hexane and vacuum-dried to obtain a pale yellow solid (2.51 g, a yield of 55.6%).

$^1$H-NMR (500 MHz, CDCl$_3$): 8.20 (d, J=8.5 Hz, 2H), 7.91 (t, J=8.0 Hz, 4H), 7.75-7.71 (m, 2H), 7.66 (d, J=7.0 Hz, 2H), 7.56 (t, J=7.5 Hz, 2H), 7.52-7.47 (m, 4H), 7.42-7.38 (m, 2H), 7.24-7.22 (m, 2H), 7.02-6.99 (m, 6H), 6.56-6.52 (m, 4H), 5.46 (d, J=10 Hz, 2H), 4.90 (d, J=10 Hz, 2H), 3.27-3.19 (m, 4H), 2.78-2.70 (m, 4H), 1.73-1.65 (m, 4H), 1.06 (d, J=6.5 Hz, 12H), 1.00 (d, J=7.0 Hz, 12H)

Preparation Example 4

<Preparation of Transition Metal Compound>

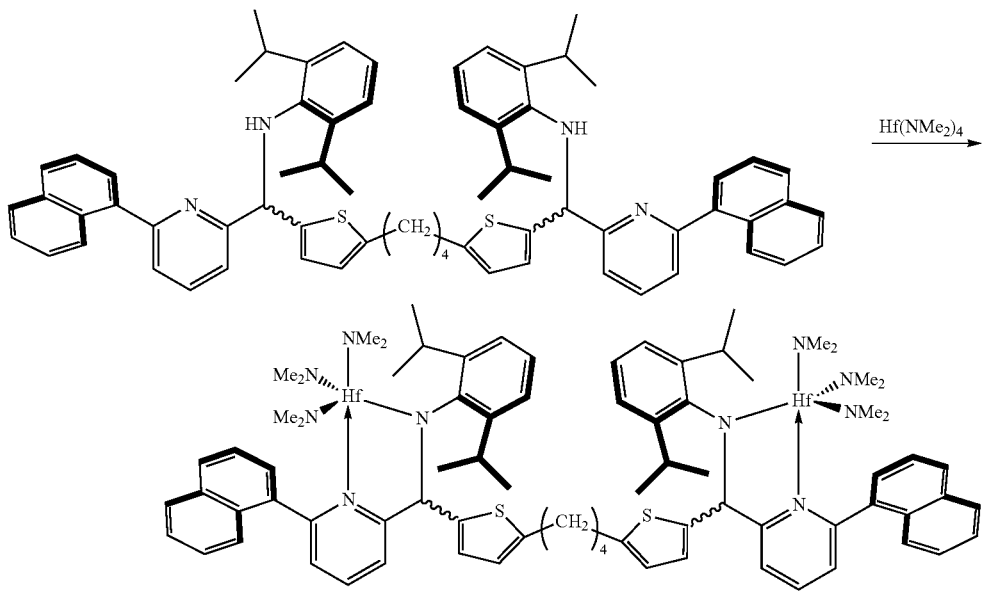

Figure 2:
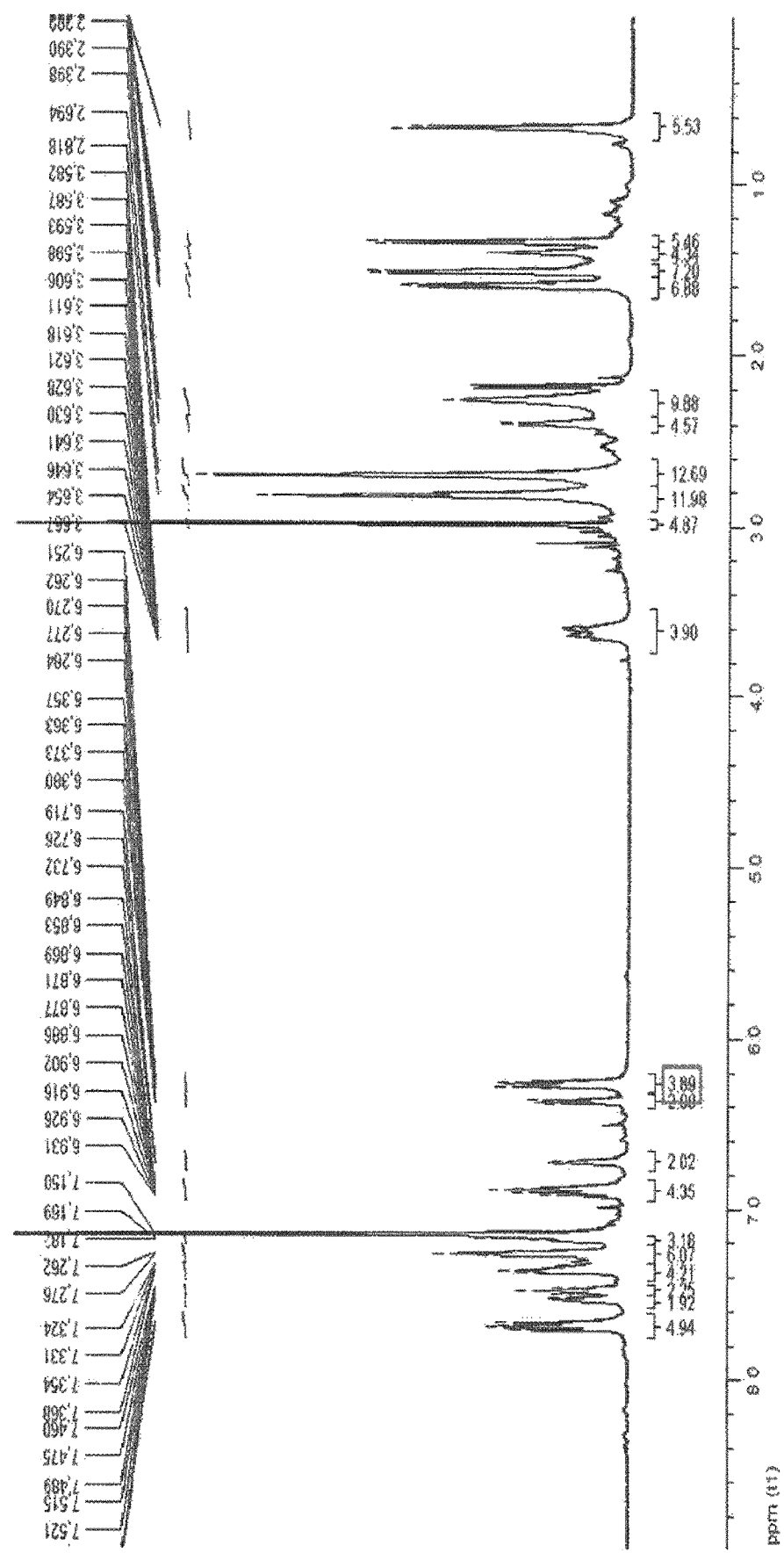
FIG. 2 is an NMR spectrum of a compound prepared in Preparation Example 4.

The ligand (1 g, 0.993 mmol) prepared in Preparation Example 3 and Hf(NMe$_2$)$_4$ (0.74 g, 2.09 mmol) were dissolved in anhydrous toluene (20 mL) at room temperature and stirred at 90° C. for 1 hour. After a certain period of time, a mixture was vacuum-dried to remove a solvent, and then dried n-hexane (20 mL) was added thereto, stirred for 10 minutes, and vacuum-dried again. This process was repeated once again, and then dried n-hexane (40 mL) was added thereto. The mixture was stirred vigorously for 10 minutes to disperse the solid, and was filtered with glass frit (G4) to obtain a yellow solid product (1.32 g, a yield of 82%). The NMR spectrum thereof is shown in FIG. 2.

Comparative Preparation Example 1

<Preparation of Ligand Compound>

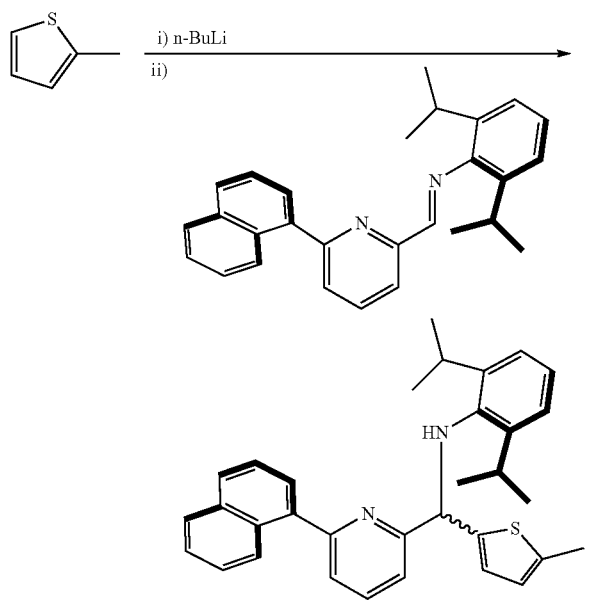

500 mg (5.1 mmol) of 2-methylthiophene was dissolved in anhydrous tetrahydrofuran (3.1 mL) at room temperature, and 2.0 mL (5.1 mmol) of n-BuLi was added at −78° C. A mixture was stirred at room temperature for 2 hours to prepare a 5-methyl-2-thienyllithium solution.

Figure 3:
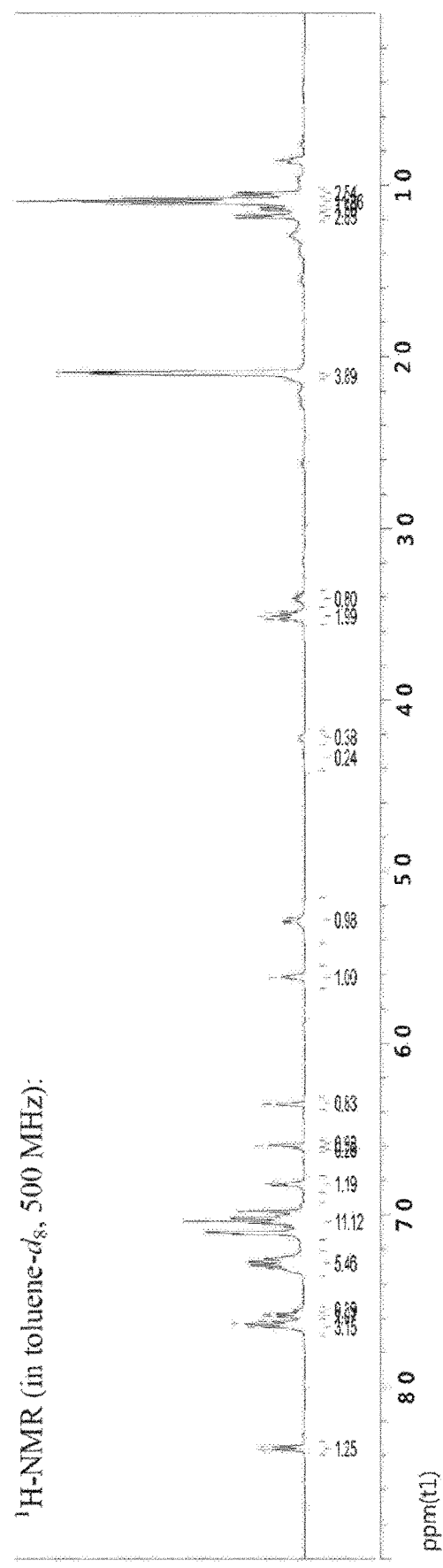

1 g (2.55 mmol) of (E)-2,6-diisopropyl-N-((6-(naphthalen-1-yl)pyridin-2-yl) methylene) aniline prepared in Preparation Example 1 was introduced into a dried 100 mL Schlenk flask, and was dissolved by adding 23 mL of anhydrous diethyl ether. 5.1 mL (in-situ generated, 1.0 M in THF, 5.1 mmol) of the prepared 5-methyl-2-thienyl lithium solution was slowly added at room temperature and stirred overnight. After confirming that the reaction was completed by TLC, 10 mL of 1 M NH$_4$Cl was added to terminate the reaction. After an organic layer was separated, an aqueous layer was extracted with diethyl ether (10 mL×2). The organic layer was collected, washed with brine, dried using Na$_2$SO$_4$, filtered and concentrated to obtain 1.19 g (a yield of 95%) of a yellow solid product. The NMR spectrum thereof is shown in FIG. 3.

Comparative Preparation Example 2

<Preparation of Catalyst>

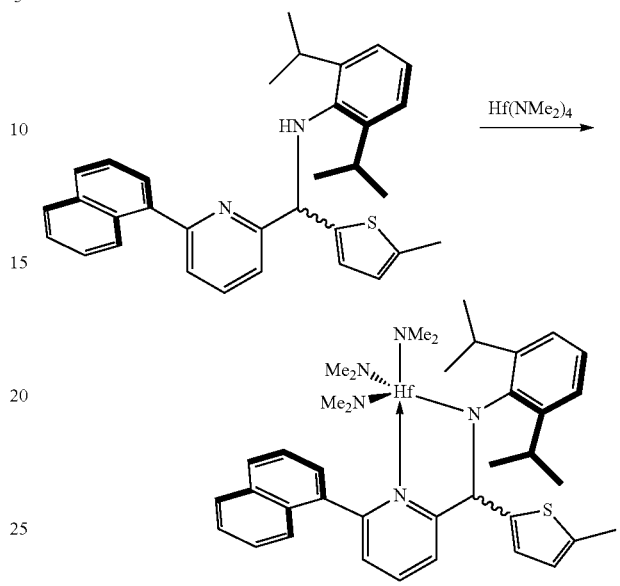

Figure 4:
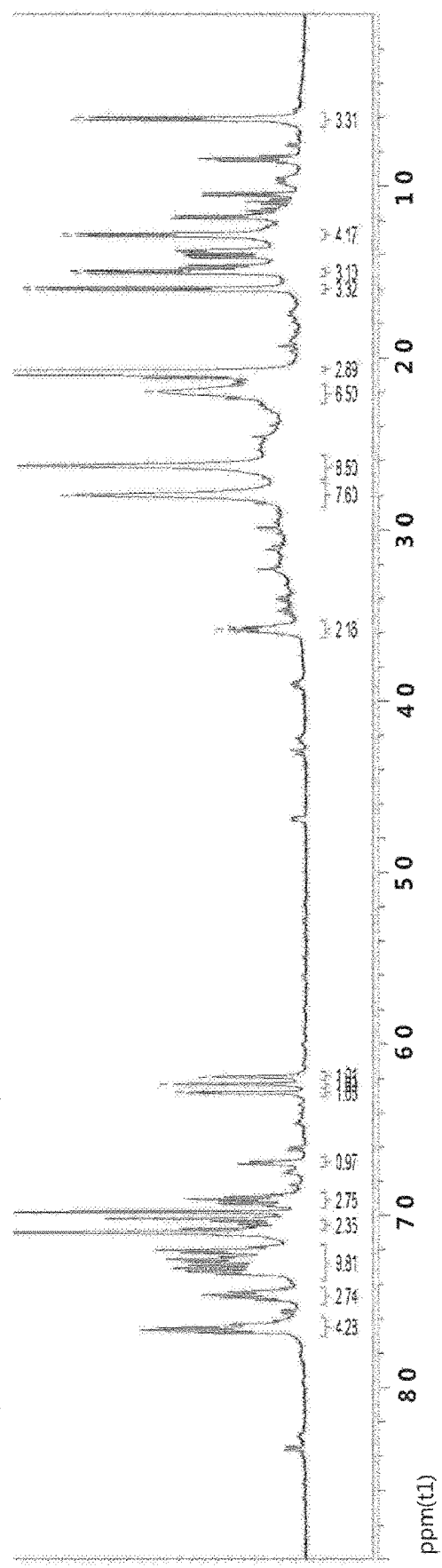

504 mg (1.03 mmol) of the ligand prepared in Comparative Preparation Example 1 and 401 mg (1.13 mmol) of tetrakis(N, N-dimethylamido) hafnium (IV) were introduced into a dried 100 mL Schlenk flask, and were dissolved by adding 10 mL of anhydrous toluene at room temperature. The reaction solution was stirred at 90° C. overnight. The reaction temperature was lowered to 70° C. and the solution was vacuum-dried to obtain 824 mg (quantitative yield) of a pale brown solid product. The NMR spectrum thereof is shown in FIG. 4.

Example 1

<Preparation of Ethylene/1-Octene Copolymer>

A hexane solvent (1.0 L) and 1-octene (1.39 M) were added to a 2 L autoclave reactor, and the temperature of the reactor was pre-heated to 120° C. At the same time, the pressure of the reactor was set by filling with ethylene (35 bar) in advance. The transition metal compound (5.0 μmol) prepared in Preparation Example 2 treated with a trimethyl aluminum compound and a dimethylanilinium tetrakis(pentafluorophenyl) borate cocatalyst (100 μmol) were sequentially introduced into the reactor while applying high argon pressure (a molar ratio of Al:Ti=5:1). Subsequently, the polymerization reaction was performed for 10 minutes. Thereafter, a residual ethylene gas was exhausted, the polymer solution obtained from the reaction was added to an excessive amount of ethanol to induce precipitation. The precipitated polymer was washed with ethanol and acetone twice and three times, respectively, and was dried in a vacuum oven at 80° C. for at least 12 hours, and the physical properties were measured.

Example 2 and Comparative Example 1

<Preparation of Ethylene/1-Octene Copolymer>

A copolymer was prepared in the same manner as in Example 1 except that the transition metal compound prepared in Preparation Example 4 and the transition metal compound prepared in Comparative Preparation Example 2 were respectively used instead of the transition metal compound prepared in Preparation Example 2.

Experimental Example 1: Evaluation of Physical Properties

The catalyst activity in the preparation of the copolymers, the melt index (MI) and density of the prepared copolymers in Examples 1 and 2 and Comparative Example 1 were measured by the following methods, and the results are shown in Table 1 below.

(1) The catalytic activity was calculated using the molar ratio of the transition metal compound to the total yield of the prepared copolymer. Specifically, the ratio of a value obtained by measuring the mass of a part of the reaction solution taken after completion of the polymerization reaction to a value obtained by heating a part of the copolymer at 120° C. for 10 minutes to remove both the hexane solvent and the residual monomer and measuring the mass of the remaining copolymer was calculated. Based on this, the catalytic activity was calculated using the mass of the resulting copolymer, the number of moles of the transition metal compound used in the polymerization reaction, and the polymerization time.

(2) The melt index (MI) of the polymer was measured by ASTM D-1238 (condition E, 190° C., a load of 2.16 kg).

(3) The density was measured on a Mettler scale after preparing a sample treated with an antioxidant (1,000 ppm) as a sheet having a thickness of 3 mm and a radius of 2 cm using a press mold at 180° C., and cooling the sheet at a rate of 10° C./min.

TABLE 1

| | Copolymer weight (units: g) | Catalytic activity (Kg/mmol(Hf) · hr) | MI (g/10 min) | Density (g/cc) |
|---|---|---|---|---|
| Example 1 | 36.8 | 22.1 | 4.9 | 0.895 |
| Example 2 | 44.2 | 26.5 | 5.6 | 0.895 |
| Comparative Example 1 | 28.8 | 17.3 | 28.8 | 0.898 |

Referring to Table 1, it can be determined that the catalyst compositions of Examples 1 and 2 in which the transition metal compounds according to Preparation Examples 2 and 4 were used show higher activity and more excellent copolymerization properties than the catalyst composition of Comparative Example 1 in which the transition metal compound according to Comparative Preparation Example 2 was used, and particularly, a polymer having a high molecular weight can be prepared.

The invention claimed is:

1. A catalyst composition, comprising:
a transition metal compound represented by the following Formula 1; and
one or more of a compound represented by the following Formula 2, a compound represented by the following Formula 3 and a compound represented by the following Formula 4:

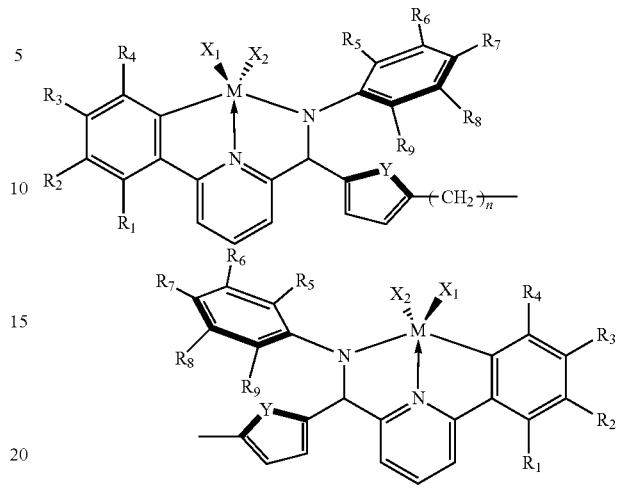

[Formula 1]

$-[Al(R_{10})-O]_a-$      [Formula 2]

$A(R_{11})_3$      [Formula 3]

$[L-H]^+[WD_4]^-$ or $[L]^+[WD_4]^-$      [Formula 4]

in Formula 1,
$R_1$ to $R_9$ are each independently selected from the group consisting of hydrogen, a halogen, an alkyl having 1 to 20 carbon atoms, an alkenyl having 2 to 20 carbon atoms, a cycloalkyl having 3 to 20 carbon atoms, an aryl having 6 to 20 carbon atoms, an arylalkyl having 7 to 20 carbon atoms, an alkylaryl having 7 to 20 carbon atoms, an alkoxy having 1 to 20 carbon atoms, an aryloxy having 6 to 20 carbon atoms, a silyl, and a combination thereof, or two or more adjacent functional groups of $R_1$ to $R_9$ are connected to each other to form an aliphatic ring having 6 to 20 carbon atoms or an aromatic ring having 3 to 20 carbon atoms;
$X_1$ and $X_2$ are each independently selected from the group consisting of a halogen, an alkyl having 1 to 20 carbon atoms, an alkenyl having 2 to 20 carbon atoms, a cycloalkyl having 3 to 20 carbon atoms, an aryl having 6 to 20 carbon atoms, an alkylaryl having 7 to 20 carbon atoms, an arylalkyl having 7 to 20 carbon atoms, an alkylamino having 1 to 20 carbon atoms, an arylamino having 6 to 20 carbon atoms, and an alkylidene having 1 to 20 carbon atoms;
where the cycloalkyl and aryl are optionally independently substituted with 1 to 5 substituents selected from the group consisting of a halogen, $-CF_3$, $-NO_2$, $-OH$, $-SH$, $-CN$, an alkoxy having 1 to 6 carbon atoms, an alkyl having 1 to 8 carbon atoms, an alkenyl having 2 to 8 carbon atoms, and an alkynyl having 2 to 8 carbon atoms;
M is a Group 4 metal;
Y is a Group 16 element; and
n is an integer of 3 to 20;
in Formulas 2 to 4,
$R_{10}$ and $R_{11}$ are the same or different and are each independently selected from the group consisting of a halogen, a hydrocarbyl having 1 to 20 carbon atoms, and a hydrocarbyl having 1 to 20 carbon atoms substituted with a halogen;
A is aluminum or boron;

D independently represents an aryl having 6 to 20 carbon atoms or an alkyl having 1 to 20 carbon atoms in which at least one hydrogen atom is optionally substituted with a substituent, and the substituent is at least one selected from the group consisting of a halogen, a hydrocarbyl having 1 to 20 carbon atoms, an alkoxy having 1 to 20 carbon atoms and an aryloxy having 6 to 20 carbon atoms;

H is a hydrogen atom;

L is a neutral or cationic Lewis acid;

W is a Group 13 element; and a is an integer of 2 or more.

2. The catalyst composition according to claim 1, wherein, in Formula 1, $R_1$ to $R_9$ are each independently selected from the group consisting of hydrogen, a halogen, and an alkyl having 1 to 8 carbon atoms, and $R_1$ and $R_2$ are connected to each other to form an aliphatic ring having 3 to 12 carbon atoms or an aromatic ring having 6 to 12 carbon atoms;

$X_1$ and $X_2$ are each independently selected from the group consisting of a halogen, an alkyl having 1 to 12 carbon atoms, an alkylamino having 1 to 12 carbon atoms, and an arylamino having 6 to 12 carbon atoms;

where the cycloalkyl and aryl are optionally independently substituted with 1 to 5 substituents selected from the group consisting of a halogen, an alkoxy having 1 to 6 carbon atoms, and an alkyl having 1 to 6 carbon atoms;

M is Ti, Zr or Hf;

Y is O or S; and n is an integer of 3 to 8.

3. The catalyst composition according to claim 1, wherein, in Formula 1, $R_1$ to $R_9$ are each independently selected from the group consisting of hydrogen and an alkyl having 1 to 6 carbon atoms, and $R_1$ and $R_2$ are connected to each other to form an aromatic ring having 5 to 12 carbon atoms;

$X_1$ and $X_2$ are each independently selected from the group consisting of an alkylamino having 1 to 6 carbon atoms and an arylamino having 6 to 12 carbon atoms;

where the cycloalkyl and aryl are optionally independently substituted with 1 to 5 substituents selected from the group consisting of a halogen, an alkoxy having 1 to 6 carbon atoms, and an alkyl having 1 to 6 carbon atoms;

Y is O or S; and n is an integer of 3 to 8.

4. The catalyst composition according to claim 1, wherein the transition metal compound represented by Formula 1 is a compound of the following Formula 5:

[Formula 5]

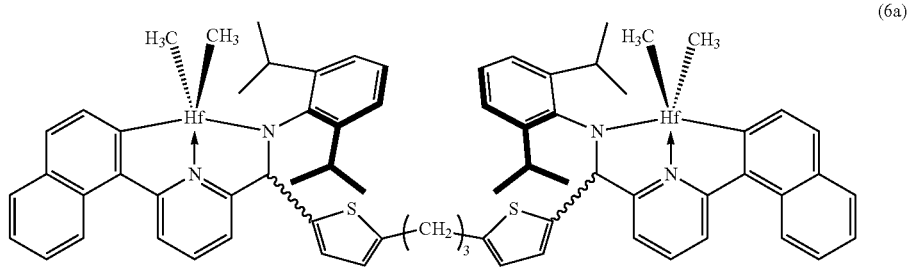

in Formula 5, $R_3$ to $R_9$ are each independently selected from the group consisting of hydrogen and an alkyl having 1 to 6 carbon atoms;

$X_1$ and $X_2$ are each independently an alkylamino having 1 to 6 carbon atoms;

Y is O or S; and n is an integer of 3 to 8.

5. The catalyst composition according to claim 1, wherein the compound of Formula 1 is selected from the group consisting of the following Formulas 6a to 6r:

(6a)

-continued
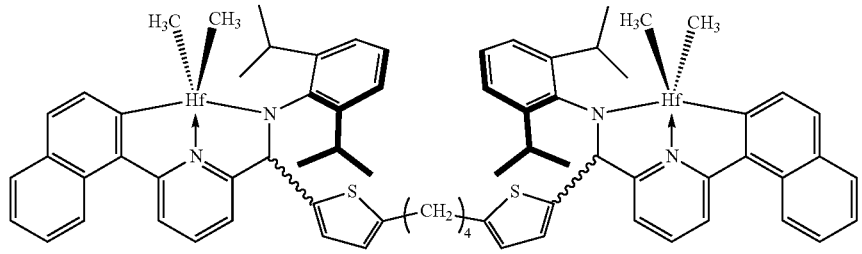
(6b)
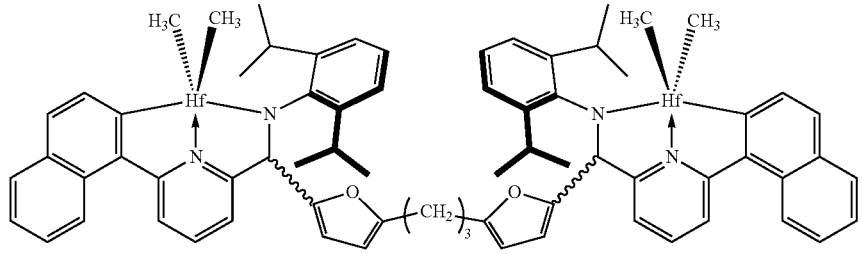
(6c)
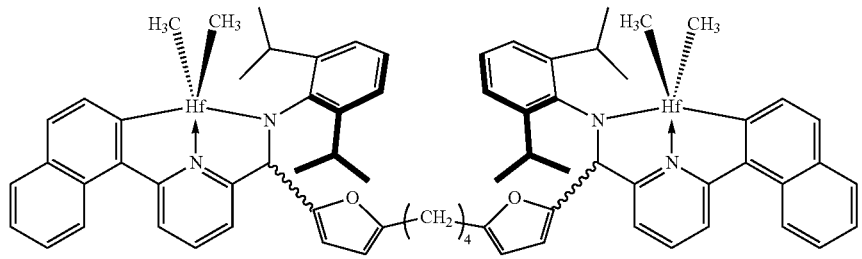
(6d)
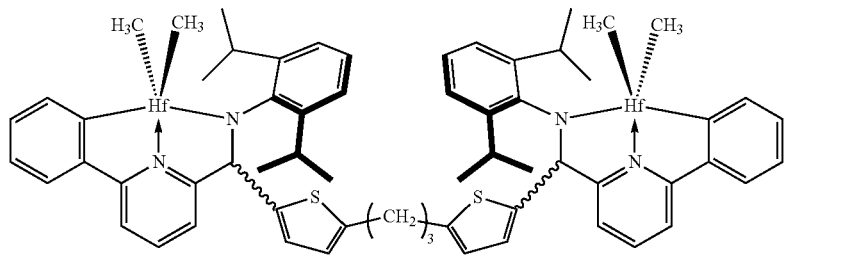
(6e)
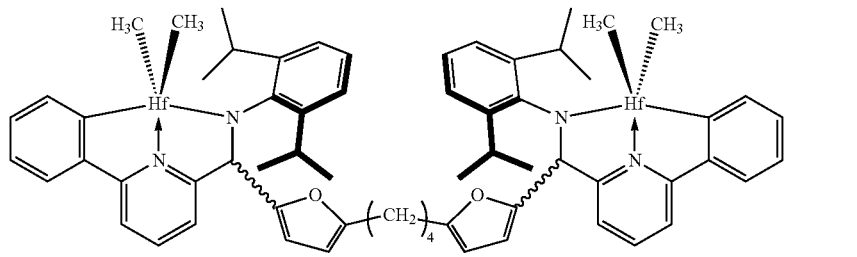
(6f)
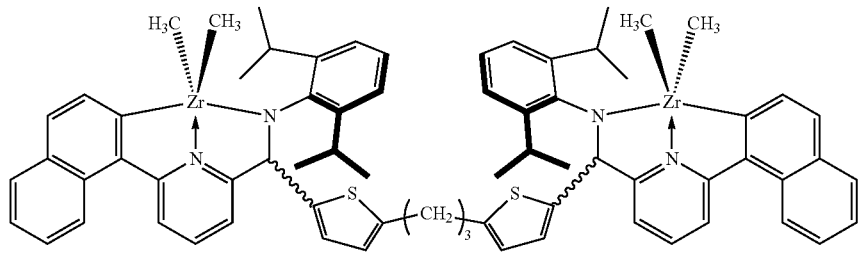
(6g)

-continued
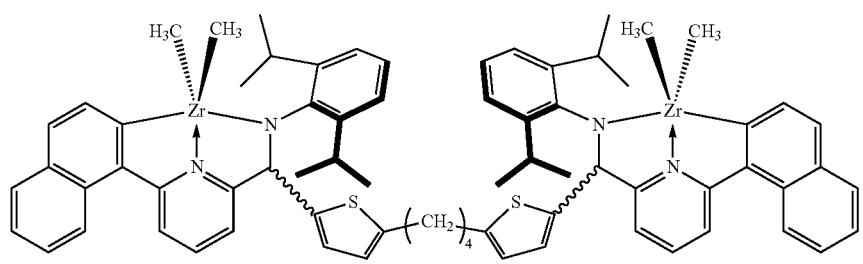
(6h)
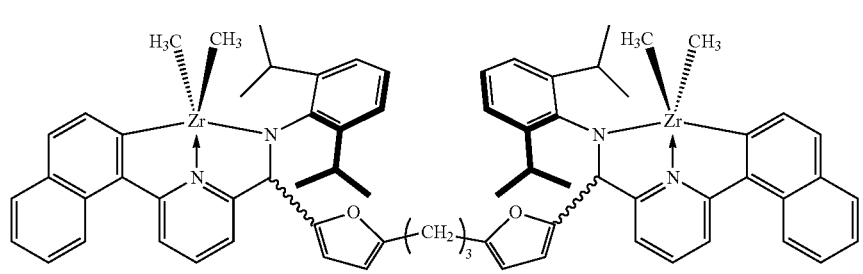
(6i)
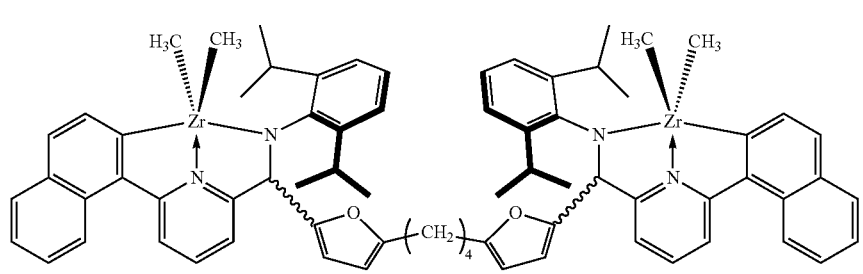
(6j)
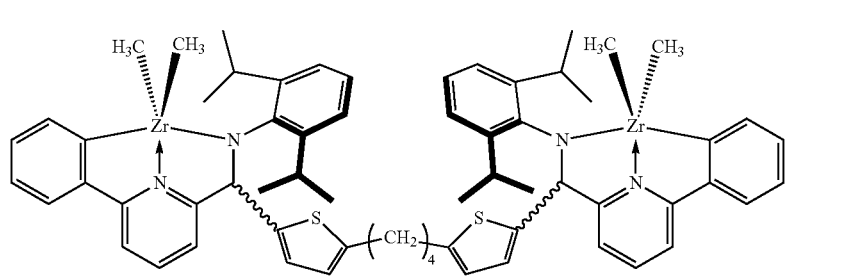
(6k)
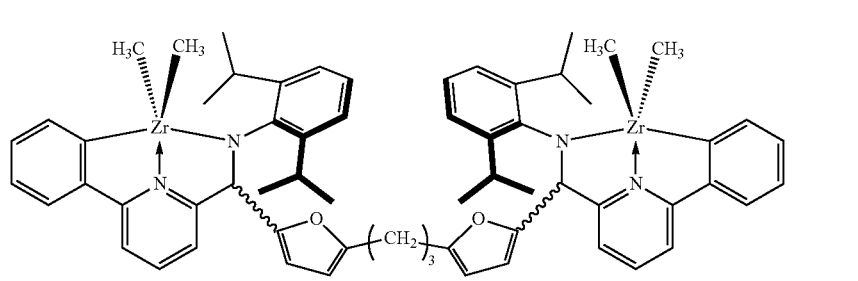
(6l)
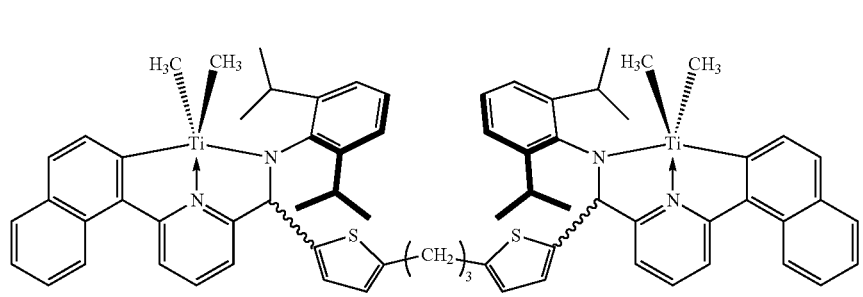
(6m)

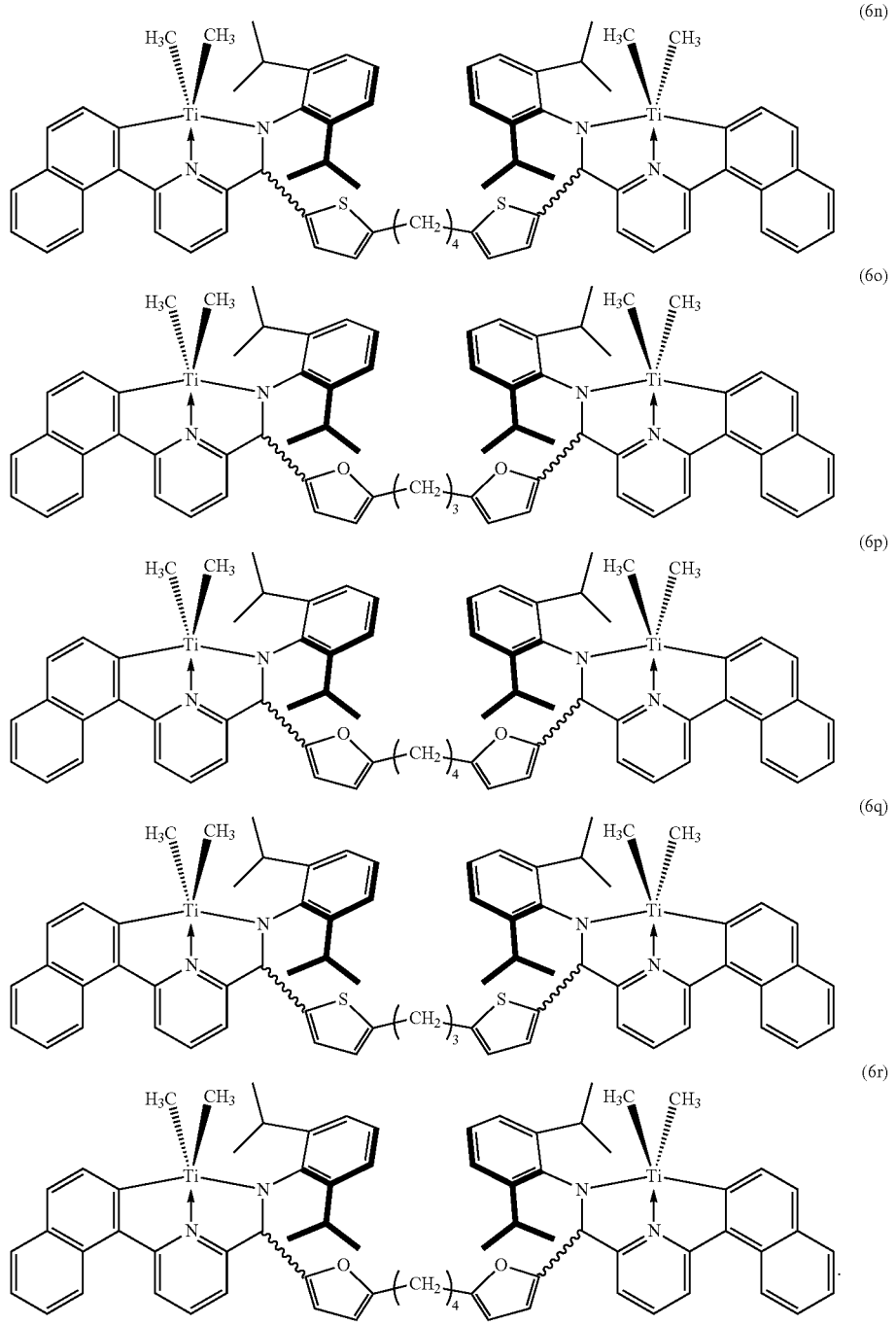

6. The catalyst composition according to claim 1, wherein the compound represented by Formula 2 is one or more selected from the group consisting of methyl aluminoxane (MAO), ethyl aluminoxane, isobutyl aluminoxane, butyl aluminoxane, and a modified alkyl aluminoxane in which two or more thereof are mixed.

7. The catalyst composition according to claim 1, wherein the compound represented by Formula 3 is one or more selected from the group consisting of trimethyl aluminum, triethyl aluminum, triisobutyl aluminum, tripropyl aluminum, tributyl aluminum, dimethylchloroaluminum, triisopropyl aluminum, tri-s-butyl aluminum, tricyclopentyl aluminum, tripentyl aluminum, triisopentyl aluminum, trihexyl aluminum, trioctyl aluminum, ethyl dimethyl aluminum, methyl diethyl aluminum, triphenyl aluminum, tri-p-tolyl aluminum, dimethyl aluminum methoxide, dimethyl aluminum ethoxide, trimethylboron, triethylboron, triisobutylboron, tripropylboron and tributylboron.

8. The catalyst composition according to claim 1, wherein the compound represented by Formula 4 is one or more selected from the group consisting of triethylammonium tetraphenylboron, tributylammonium tetraphenylboron, trimethylammonium tetraphenylboron, tripropylammonium tetraphenylboron, trimethylammonium tetra(p-tolyl) boron, trimethylammonium tetra (o,p-dimethylphenyl) boron, tributylammonium tetra(p-trifluoromethylphenyl) boron, trimethylammonium tetra(p-trifluoromethylphenyl) boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, dimethylanilinium tetrakis(pentafluorophenyl) borate, triethylammonium tetraphenyl aluminum, tributylammonium tetraphenyl aluminum, trimethylammonium tetraphenyl aluminum, tripropylammonium tetraphenyl aluminum, trimethylammonium tetra(p-tolyl) aluminum, tripropylammonium tetra(p-tolyl) aluminum, triethylammonium tetra(o,p-dimethylphenyl) aluminum, tributylammonium tetra(p-trifluoromethylphenyl) aluminum, trimethylammonium tetra(p-trifluoromethylphenyl) aluminum, tributylammonium tetrapentafluorophenyl aluminum, N,N-diethylanilinium tetraphenyl aluminum, N,N-diethylanilinium tetrapentafluorophenyl aluminum, diethylammonium tetrapentatetraphenyl aluminum, triphenylphosphonium tetraphenyl aluminum, trimethylphosphonium tetraphenyl aluminum, tripropylammonium tetra(p-tolyl) boron, triethylammoniumtetra(o,p-dimethylphenyl) boron, triphenylcarbonium tetra(p-trifluoromethylphenyl) boron and triphenylcarbonium tetrapentafluorophenylboron.

9. A method of preparing the catalyst composition according to claim 1, comprising:
contacting the transition metal compound represented by Formula 1 with at least one of the compound represented by Formula 2, 3 or 4.

10. A method of preparing a polymer, comprising contacting the catalyst composition according to claim 1 with a monomer.

11. A polymer prepared from a monomer by using the catalyst composition according to claim 1.

12. The polymer according to claim 11, wherein the monomer comprises at least one of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or 1-eicosene.

* * * * *